(12) United States Patent
Brooks

(10) Patent No.: US 10,007,657 B2
(45) Date of Patent: Jun. 26, 2018

(54) CONTENT DEVELOPMENT AND DISTRIBUTION USING COGNITIVE SCIENCES DATABASE

(71) Applicant: 3M INNOVATIVE PROPERTIES COMPANY, St. Paul, MN (US)

(72) Inventor: Brian E. Brooks, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 216 days.

(21) Appl. No.: 14/261,929

(22) Filed: Apr. 25, 2014

(65) Prior Publication Data

US 2014/0237331 A1 Aug. 21, 2014

Related U.S. Application Data

(63) Continuation of application No. 12/159,106, filed as application No. PCT/US06/49662 on Dec. 29, 2003, (Continued)

(51) Int. Cl.
*G06F 3/048* (2013.01)
*G06F 17/24* (2006.01)
(Continued)

(52) U.S. Cl.
CPC ........ *G06F 17/248* (2013.01); *G06F 3/04842* (2013.01); *G06N 5/04* (2013.01);
(Continued)

(58) Field of Classification Search
CPC . G06F 17/248; G06F 3/0482; G06Q 30/0242; G06Q 30/0276; G06Q 30/0277
See application file for complete search history.

(56) References Cited

U.S. PATENT DOCUMENTS

| 5,253,331 A | 10/1993 | Lorenzen |
| 5,287,266 A | 2/1994 | Malec |

(Continued)

FOREIGN PATENT DOCUMENTS

| GB | 2309805 | 6/1997 |
| JP | H07-244568 | 9/1995 |

(Continued)

OTHER PUBLICATIONS

Arch G. Woodside, Measuring Advertising Effectiveness in Destination Marketing Strategies. Journal of Travel Research, Aug. 1990, vol. 29, No. 2, pp. 3-6.

(Continued)

*Primary Examiner* — Dino Kujundzic
(74) *Attorney, Agent, or Firm* — Emily V. Hargett; Christina Huang

(57) ABSTRACT

Computer implemented methods and systems facilitate development and distribution of content for presentation on a display or a multiplicity of networked displays, the content including content elements. The content elements may include graphics, text, video clips, still images, audio clips or web pages. The development of the content is facilitated using a database comprising design rules based on principles of cognitive and vision sciences. The database may include design rules based on visual attention, memory, and/or text recognition, for example.

16 Claims, 10 Drawing Sheets

Related U.S. Application Data now abandoned, which is a continuation-in-part of application No. 11/321,340, filed on Dec. 29, 2005, now abandoned.

(51) Int. Cl.
*G06Q 10/00* (2012.01)
*G06Q 30/02* (2012.01)
*G06N 5/04* (2006.01)
*G06F 3/0484* (2013.01)

(52) U.S. Cl.
CPC ......... *G06Q 10/00* (2013.01); *G06Q 30/0245* (2013.01); *G06Q 30/0246* (2013.01)

(56) References Cited

U.S. PATENT DOCUMENTS

| | | | |
|---|---|---|---|
| 5,309,174 A | 5/1994 | Minkus | |
| 5,474,385 A | 12/1995 | Reading | |
| 5,513,342 A | 4/1996 | Leong et al. | |
| 6,023,714 A | 2/2000 | Hill et al. | |
| 6,137,483 A | 10/2000 | Kiyono | |
| 6,169,981 B1 | 1/2001 | Werbos | |
| 6,317,700 B1 | 11/2001 | Bagne | |
| 6,529,940 B1 | 3/2003 | Humble | |
| 6,604,092 B1 | 8/2003 | Stewart | |
| 6,840,905 B2 | 1/2005 | Gotschim | |
| 6,934,415 B2 | 8/2005 | Stentiford | |
| 6,934,748 B1 | 8/2005 | Louviere | |
| 7,089,322 B1 | 8/2006 | Stallman | |
| 7,130,461 B2 | 10/2006 | Rosenholtz | |
| 7,130,808 B1 | 10/2006 | Ranka | |
| 7,136,871 B2 | 11/2006 | Ozer | |
| 7,216,092 B1 | 5/2007 | Weber et al. | |
| 7,260,261 B2 | 8/2007 | Xie | |
| 7,308,497 B2 | 12/2007 | Louviere | |
| 7,406,434 B1 | 7/2008 | Chang et al. | |
| 7,460,708 B2 | 12/2008 | Kayahara | |
| 7,594,189 B1* | 9/2009 | Walker ................. | G06Q 30/02 715/811 |
| 2001/0018668 A1 | 8/2001 | Yanase | |
| 2002/0026478 A1 | 2/2002 | Rodgers | |
| 2002/0109721 A1 | 8/2002 | Konaka | |
| 2002/0112035 A1 | 8/2002 | Carey | |
| 2002/0129367 A1 | 9/2002 | Kavitha | |
| 2002/0161779 A1 | 10/2002 | Brierley | |
| 2003/0046376 A1 | 3/2003 | Hsiang-Tsun | |
| 2003/0083822 A2 | 5/2003 | Brunner | |
| 2003/0220830 A1 | 11/2003 | Myr | |
| 2004/0015399 A1 | 1/2004 | Maggio | |
| 2004/0015401 A1 | 1/2004 | Lee et al. | |
| 2004/0034572 A1 | 2/2004 | Solem | |
| 2004/0075685 A1 | 4/2004 | Ohyama | |
| 2004/0088726 A1 | 5/2004 | Ma | |
| 2004/0165784 A1* | 8/2004 | Xie ...................... | G06K 9/3233 382/254 |
| 2004/0205116 A1 | 10/2004 | Pulier | |
| 2004/0210471 A1 | 10/2004 | Luby | |
| 2004/0260767 A1 | 12/2004 | Kedem et al. | |
| 2005/0021765 A1 | 1/2005 | Flores et al. | |
| 2005/0039206 A1 | 2/2005 | Opdycke | |
| 2005/0047647 A1 | 3/2005 | Rutishauser | |
| 2005/0055193 A1 | 3/2005 | Bondarenko | |
| 2005/0076290 A1 | 4/2005 | Balinsky | |
| 2005/0159921 A1 | 7/2005 | Louviere | |
| 2005/0171843 A1 | 8/2005 | Brazell | |
| 2005/0195221 A1 | 9/2005 | Berger | |
| 2006/0049657 A1 | 3/2006 | Searfoss | |
| 2006/0049662 A1 | 3/2006 | Miyahara | |
| 2006/0064339 A1 | 3/2006 | Allred | |
| 2006/0070026 A1 | 3/2006 | Balinsky | |
| 2006/0179418 A1 | 8/2006 | Boyd | |
| 2006/0193536 A1 | 8/2006 | Pilu | |
| 2006/0200759 A1 | 9/2006 | Agrawala | |
| 2006/0215922 A1 | 9/2006 | Koch | |
| 2006/0287913 A1 | 12/2006 | Baluja | |
| 2007/0038516 A1 | 2/2007 | Apple et al. | |
| 2007/0073562 A1 | 3/2007 | Brice | |
| 2007/0100698 A1 | 5/2007 | Neiman | |
| 2007/0136133 A1 | 6/2007 | Li | |
| 2007/0156382 A1 | 7/2007 | Graham | |
| 2008/0109727 A1 | 5/2008 | Colle et al. | |
| 2008/0230604 A1 | 9/2008 | Fong | |
| 2008/0306804 A1 | 12/2008 | Opdycke | |
| 2009/0012847 A1 | 1/2009 | Brooks | |
| 2009/0012848 A1 | 1/2009 | Brooks | |
| 2009/0012927 A1 | 1/2009 | Brooks | |
| 2009/0030780 A1 | 1/2009 | York | |
| 2009/0281896 A1 | 11/2009 | Brooks | |
| 2010/0017288 A1 | 1/2010 | Graham, II | |
| 2010/0174671 A1 | 7/2010 | Brooks | |

FOREIGN PATENT DOCUMENTS

| | | |
|---|---|---|
| JP | 08-241191 | 9/1996 |
| JP | 10-97415 | 4/1998 |
| JP | 10-154070 | 6/1998 |
| JP | 2001-265904 | 9/2001 |
| JP | 2002-032210 | 1/2002 |
| JP | 2002-197403 | 7/2002 |
| JP | 2002-330415 | 11/2002 |
| JP | 2003-529116 | 9/2003 |
| JP | 2004-178276 | 6/2004 |
| JP | 2005-037563 | 2/2005 |
| KR | 10-2003-0027565 | 4/2003 |
| KR | 10-2003-0040263 | 5/2003 |
| KR | 10-2008-0089424 | 10/2008 |
| RU | 2134457 | 8/1999 |
| WO | WO 2001-093083 | 12/2001 |
| WO | WO 2004-051430 | 6/2004 |
| WO | WO 2006/024108 | 3/2006 |
| WO | WO 2007-078897 | 7/2007 |
| WO | WO 2007-079254 | 7/2007 |
| WO | WO 2009-006542 | 1/2009 |
| WO | WO 2009-006545 | 1/2009 |
| WO | WO 2009-006546 | 1/2009 |
| WO | WO 2010-080722 | 7/2010 |

OTHER PUBLICATIONS

"How might the rules that govern visual search constrain the design of visual displays?" Jeremy M. Wolfe, Brigham and Women's Hospital & Harvard Medical School, SID 00 Digest, 2005, pp. 1-3.

Goldstein, E. Bruce, "Cognitive Psychology, Connecting Mind, Research, and Everyday Experience," Thompson/Wadsworth 2005.

Campbell, D. T., & Stanley, J. C. (1963) *Experimental and quasi-experimental designs for research*, Chicago: Rand McNally.

Don E. Schultz, Market Research Deserves Blame for Marketing's Decline, Marketing News, Feb. 15, 2005.

D. Allison and R. Allison, Statistically Powerful Studies While Minimizing Financial Costs, Physiological Methods, 1997, vol. 2, No. 1, 20-33.

"Design Your Own Experiments", Royer, [online],[retrieved from the Internet on Oct. 7, 2005], <http://www.cognitive-aptitude-assessment-software.com/DesignExperiments.html>, 1 page.

"Designer Module", Royer, [online],[retrieved from the Internet on Oct. 7, 2005], <http://www.cognitive-aptitude-assessment-software.com/DesignerModule.html>, 1 page.

"Graphical Interface", Royer, [online],[retrieved from the Internet on Oct. 7, 2005], <http://www.cognitive-aptitude-assessment-software.com/Reporting/GraphicalInterface.html>, 2 pages.

Itti, Short Papers, A Model of Saliency-Based Visual Attention for Rapid Scene Analysis, IEEE Transactions on Pattern Analysis and Machine Intelligence, vol. 20, No. 11, pp. 1254-1259, (1998). (XP001203933).

Itti, A Saliency-Based Search Mechanism for Overt and Covert Shifts of Visual Attention, Vision Research vol. 40, pp. 1489-1506, (2000).

(56) References Cited

OTHER PUBLICATIONS

Iurgel, Automatic Media Monitoring Using Stochastic Pattern Recognition Techniques, Doctoral Thesis, Munich University of Technology, pp. 1-163, (2005).
Koch, Shifts in Selective Visual Attention: Towards the Underlying Neural Circuitry, Human Neurobiology, vol. 4, pp. 219-227, (1985).
Krebs, A Simple Tool for Predicting the Readability of a Monitor, Proceedings of the Human Factors and Ergonomics Society, pp. 1659-1663, (2002).
Niederhoffer, Linguistic Style Matching in Social Interaction, Journal of Language and Social Psychology, vol. 21, No. 4, pp. 337-360, (Dec. 2002).
"Statement in Accordance with the Notice From the European Patent Office dated Oct. 1, 2007 Concerning Business Methods", 1 page. ( XP002456252).
Tolli, Motivational and Self-Regulatory Responses to Interruptions, Doctoral Thesis, The University of Akron, pp. 1-235, (May 2009).
White, Implicit Feedback for Interactive Information Retrieval, Doctoral Thesis, University of Glasgow, Department of Computing Science, pp. 1-302, (Oct. 2004).
Johnson, Dr. R. Bruke, "Chapter 9 Experimental Research", published Jun. 14, 2008. Rettrieved Aug. 30, 2011. <http:>//www.southalabama.edu/coe/bset/Johnson/lecture/lec9.htm>.
Iurgel, Automatic Media Monitoring Using Stochastic Pattern Recognition Techniques, Doctoral Thesis, Munich University of Technology, 2005, pp. 1-163.
White, Implicit Feedback for Interactive Information Retrieval, Doctoral Thesis, University of Glasgow, Department of Computing Science, Oct. 2004, pp. 1-302.
Niederhoffer, et al. Linguistic Style Matching in Social Interaction, Journal of Language and Social Psychology, vol. 21, No. 4, Dec. 2002, pp. 337-360.
Tolli, Motivational and Self-Regulatory Responses to Interruptions, Doctoral Thesis, The University of Akron, May 2009, pp. 1-235.
Etsukou Iizuka: Dictionary of Manufacturing Management, Asakura Publishing Co., Ltd, Nov. 1, 1999, first impression of the first edition, pp. 525-534.
Taichiro Ueda: New Data Mining Initiation Course, Data Analysis and Prediction Science, Management Consulting, Japan Small and Medium Enterprise Management Consultants Association, Jun. 1, 2001, vol. 49, No. 6, pp. 78-83.
Search Report for PCTUS2006-048110, dated Jun. 13, 2007, 1 page.
Search Report for PCTUS2006-049657, dated Jun. 22, 2007, 2 pages.
Written Opinion for PCTUS2006-049657, dated Jun. 22, 2007, 4 pages.
Search Report for PCTUS2006-049662, dated Jun. 25, 2007, 2 pages.
Written Opinion for PCTUS2006-049662, dated Jun. 25, 2007, 4 pages.
Search Report for PCTUS2008-069068, dated Jan. 21, 2009, 3 pages.
Written Opinion for PCTUS2008-069068, dated Jan. 21, 2009, 4 pages.
Search Report for PCTUS2008-069076, dated Jan. 22, 2009, 3 pages.
Written Opinion for PCTUS2008-069076, dated Jan. 22, 2009, 4 pages.
Search Report for PCTUS2008-069077, dated Jan. 16, 2009, 3 pages.
Written Opinion for PCTUS2008-069077, dated Jan. 16, 2009, 3 pages.
Search Report for PCTUS2010-020006, dated Jul. 16, 2010, 3 pages.
Written Opinion for PCTUS2010-020006, dated Jul. 16, 2010, 5 pages.

* cited by examiner

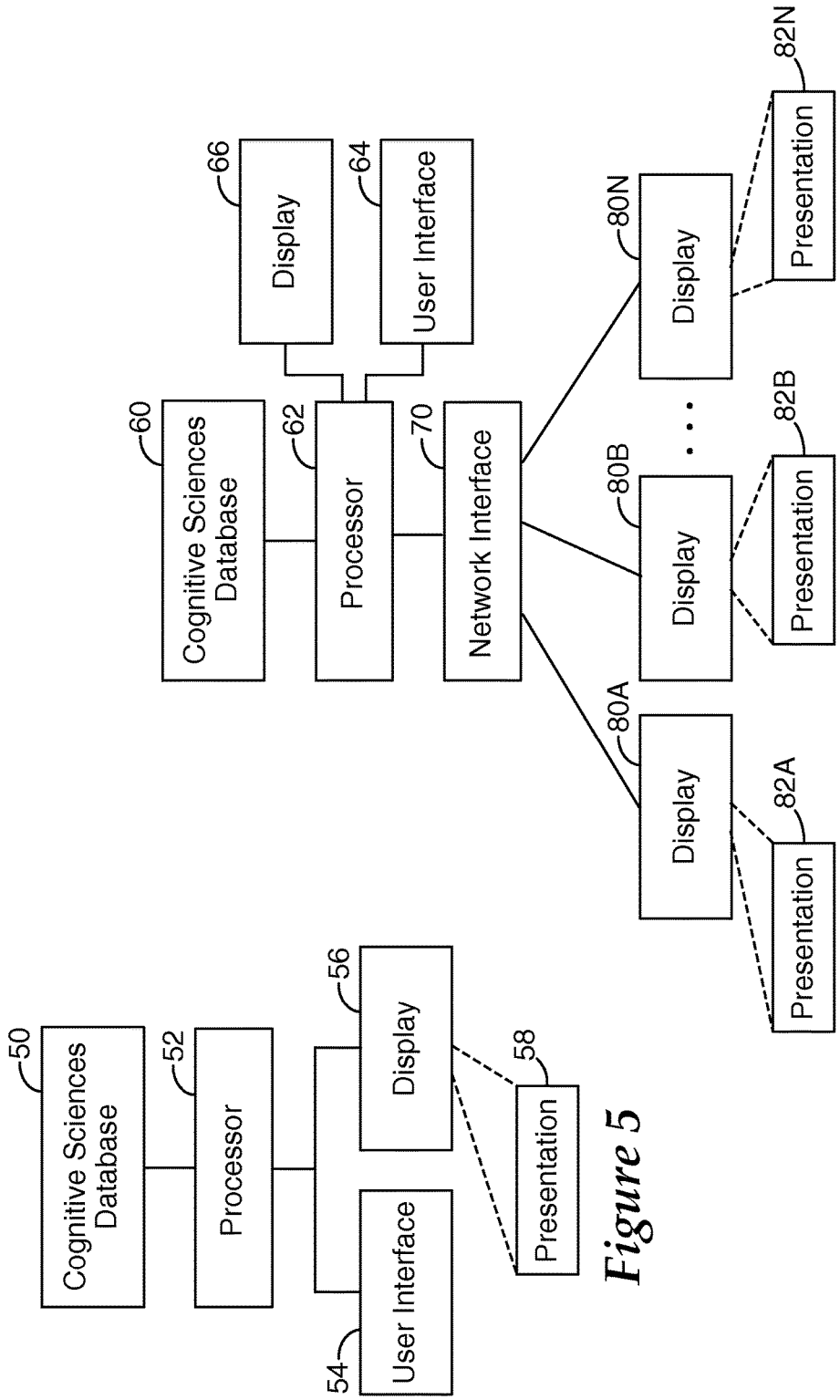

CONTENT DEVELOPMENT AND DISTRIBUTION USING COGNITIVE SCIENCES DATABASE

FIELD OF THE INVENTION

The present invention relates to methods and systems for developing content for presentation on a display or a multiplicity of networked displays.

BACKGROUND

Designers of content often employ computer application programs that are capable of importing and arranging various types of content. Advertisements, for example, may be developed that incorporate text, graphics, video, and audio elements, among others. In general, the effectiveness of advertising content is a function of a designer's experience, rather than the sophistication of the computer application program used to generate the advertising content.

A successful content designer generally improves his or her skills in a trial and error fashion or by relying on tried-and-true approaches. Imparting an accomplished designer's skills to a less experienced designer is often difficult if not impossible, as such skills tend to be highly stylistic and personal to the particular designer. Because the competency of designers varies significantly, so does the quality and effectiveness of the content that they produce. Conventional computer application programs for generating content generally do not provide the designer with tools that allow the designer to exceed his or her own skills for developing effective content.

SUMMARY OF THE INVENTION

The present invention is directed to systems and methods for developing and distributing content through use of computer assistance. Embodiments of the present invention are directed to a computer-assisted method for developing content for presentation on a display, the content comprising content elements. The content elements may include graphics, text, video clips, still images, audio clips or web pages. The method further involves facilitating, by way of computer assistance, the development of the content using a database comprising design rules or models based on principles of cognitive and vision sciences. The database may include design rules or models based on visual attention, memory, and/or text readability, for example.

Facilitating the development of the content may involve developing the content in compliance with design rules or models, and may involve alerting a user in response to violation of one or more of the design rules or models. Facilitating content development may involve generating user perceivable recommendations for developing the content, where the recommendations are consistent with design rules or models. Facilitating content development may involve automatically adjusting the content via computer-assistance in response to violation of one or more of the design rules or models.

Facilitating the development of the content may involve facilitating selection and/or layout of the content elements or selection of one or more attributes of the content elements in compliance with the design rules or models. The attributes of the content elements may include one or more of color, brightness, size, font, orientation, movement, presentation duration or flash rate, display location, and number of content elements concurrently presented on the display, among others.

Facilitating the development of the content may involve facilitating selection of content element attributes based on one or more attributes of the display. The display attributes may include one or more of display type, display size, display shape, average viewing distance from the display, average speed of viewer movement relative to the display, viewer dwelling time, ambient lighting at a location of the display, and time of day of content presentation on the display, among others.

According to some implementations, user input data is received regarding each content element, the user input data including information concerning one or both of content goal and intended message. In such implementations, facilitating the development of the content may involve facilitating development of the content using the design rules or models and the user input data.

The content may be developed for presentation on a multiplicity of networked displays, and may involve selection of content element attributes based on one or more attributes of each of the displays. According to some implementations, user input data regarding each content element is received, the information comprising one or both of content goal and intended message. Attributes of the networked displays are identified that have implications for content development. Content development is facilitated using the design rules or models, user input data, and display attributes.

Methods of the present invention may further involve facilitating, by way of computer assistance, modification of the developed content in compliance with the design rules or models. The developed content may be modified in response to a change in one or more attributes of one or more displays of a display network, such as display type, display size, display shape, expected viewing distance from the display, ambient lighting at a location of the display, and time of day of content presentation on the display, for example.

According to other embodiments, systems of the present invention may include a database comprising design rules or models based on principles of cognitive and vision sciences, a user interface comprising a display, and a processor coupled to the database and user interface. The processor is configured to facilitate development of content for presentation on the display in compliance with the design rules or models. The processor may be configured to implement one or more of the methods described hereinabove.

Embodiments of the present invention are further directed to systems and methods that provide for computer-assisted analysis of content by one or more cognitive and vision sciences (CVS) models. Content is provided or developed by a content designer. The content is input to a computer that implements one or more CVS models, such as a computational model of visual attention, a text readability model or a model of human memory. The CVS model or models perform an analysis on the content and produce an output based on the analysis results. Information representative of environmental conditions at the presentation locations and/or goals for the content may be inputs to the model(s). For example, the type of displays and average distance between displays and viewers may be environmental condition information that is input to the model(s).

Goal information that may be input to the model(s) may include goals that are associated with each of the various models, such as computational model of visual attention, a text readability model or a model of human memory. Typical goal information may include specific elements of the content to be perceived by viewers and the desired order in which such specific elements are perceived. Other goal information may include improving or optimizing text readability based on text size and/or scrolling text rate relative to viewer location and/or speed at which viewers pass by a given display. Additional goal information may include maximizing memory retention and recall of content by viewers, such as by conforming to memory capacity and duration rules of a given model.

In some implementations, the output represents recommendations for changing the content in conformance with a given model's rules or goals. The recommendations may take several forms, such as a narrative form or images. For example, a menu of possible attributes of the content that may be changed can be presented to the user. The menu of attributes may include a range of attribute values that may be changed by the user, yet still conform with a given model's rules or goals. In other implementations, the output represents a modified form of the original content produced automatically by the computer implemented CVS model or models. A number of variations of modified content may be automatically produced, each of which satisfies the rules or goals of the model or models. The user may then select a desired version of the modified content for presentation. Alternatively, the computer may select one or more of the versions for presentation. In other implementations, the various versions of modified content may be subject to a designed experimental process that improves or optimizes content presentation effectiveness for a number of networked displays, preferably on a display-by-display basis.

According to other embodiments, content may be developed and distributed in conformance with cognitive and vision sciences rules or models. A true experiment may be performed to improve or optimize presentation effectiveness of the content. A quasi-experiment or correlational experiment may also be performed to improve or optimize presentation effectiveness of the content. Conducting the true experiment may include identifying dependent variables, such as a goal of increasing sales of a particular product. Independent variables may be identified, such as parameters associated with one or more CVS models (e.g., text readability, visual attention and/or memory parameters). Content may be modified in view of the results from the true experiment or quasi-/correlational experiment. For example, content may be modified on a display-by-display basis, based on improved or optimized parameters for each display. The modified content may be presented on each of the displays. Additional true or quasi-/correlational experimentation may be conducted to further improve or optimize content presentation, particularly under changing environmental conditions or a change in the goals or intended message of the content.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 5 is a block diagram of a system for implementing computer-assisted development of content using principles of cognitive and vision sciences in accordance with embodiments of the present invention;

FIG. 6 is a block diagram of a system for implementing computer-assisted development and/or distribution of content in a manner consistent with principles of cognitive and vision sciences in accordance with embodiments of the present invention;

Figure 1:
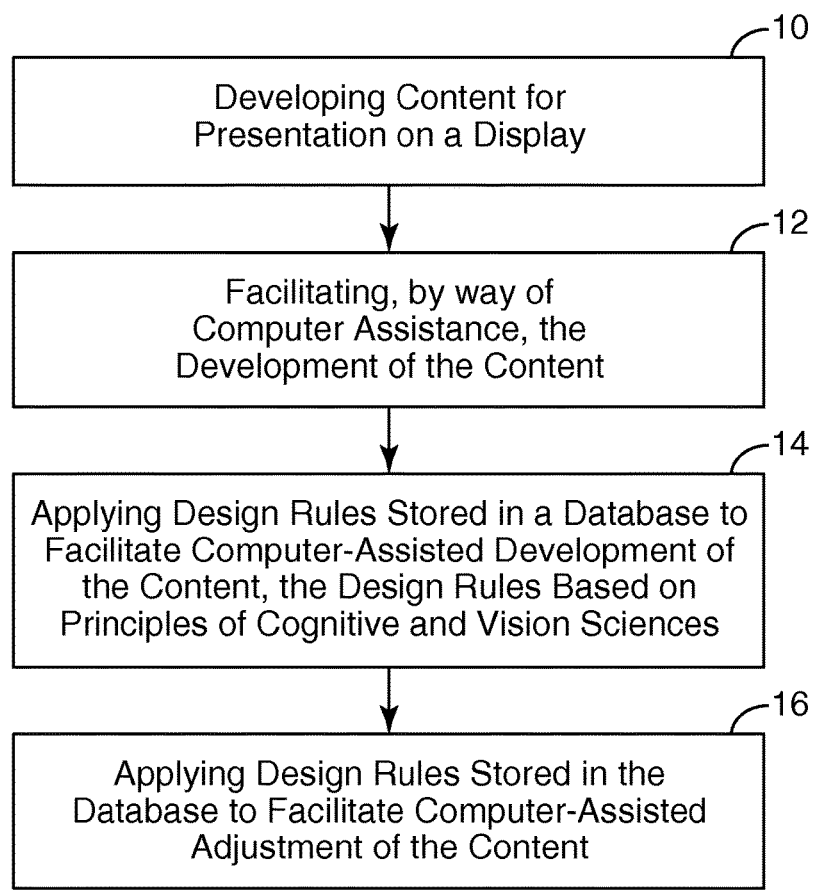
FIG. 1 illustrates various processes associated with the development of content in accordance with embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

The present invention is directed to methods and systems for creating content for presentation on a display or a multiplicity of networked displays, and facilitating, by way of computer assistance, content creation in a manner consistent with principles based on human cognitive science and vision science. Methods and systems of the present invention are also directed to distributing and adjusting content for presentation on a display or a multiplicity of networked displays in a manner consistent with principles based on human cognitive science and vision science. Developing and adjusting content may also involve performing true experiments or quasi-/correlational experiments to improve or optimize content presentation effectiveness. Creating, distributing, and adjusting content in accordance with the present invention advantageously enhances the effectiveness of content presentation as perceived by a recipient, such as potential purchaser of goods or services.

Content creation is preferably conducted in a manner consistent with principles based on one or more of how human perceptual systems process information, mechanisms that underlie attention, how the human brain stores and represents information in memory, and the cognitive basis of language and problem solving, for example. A knowledge base that stores cognitive and vision science information is preferably utilized during the content design, distribution, and/or adjustment processes in order to provide content that is easily processed by human perceptual systems, easily comprehended, and easily stored in memory. The knowledge base may include design rules and templates that may be implemented by a computer to develop and modify content in conformance with principles of cognitive and vision sciences. The knowledge base may also include computer implementable models of principles of cognitive and vision sciences, such as models of visual attention, text readability, and memory principles. Computer assisted methods and systems of the present invention allow content designers, who typically do not have the training required to apply principles from cognitive science and vision science, to increase the effectiveness of content design and distribution.

In some embodiments, computer assisted methods and systems of the present invention may be implemented to operate in a semi-automatic mode, wherein a user is led by the computer through one or more interactive sessions to design, develop, distribute, and/or adjust content. In other embodiments, computer assisted methods and systems of the present invention may be implemented in a more fully automatic manner, with minimal or no user input or interaction. In a fully automatic mode, for example, a computer-based system may create a presentation based on user selected pieces of content in a manner consistent with design rules or models stored in a cognitive sciences database. User selected pieces of content may be arranged, sized, and/or oriented on a user's display based on the design rules or models, and further in view of the goal and/or intended message of the content pieces as indicated by the user. A fully automated implementation may involve the computer-based system adjusting content elements of a given presentation based on one or more of the design rules or models, goal of the content pieces, and intended message of the contend pieces. These are but a few illustrative examples of possible levels of automaticity that can be achieved in accordance with the present invention, and are not to be regarded as exhaustive or limiting.

Aspects of the present invention will generally be discussed herein in the context of a digital signage system (DSS) or network. A DSS as contemplated in the particular embodiments described herein includes a series of interconnected (e.g., networked) display screens that are similar to traditional signs, but that can be controlled from a remote location to deliver dynamically changing content. Such displays or digital signs may be configured such that people can directly interact with signage content via touch screens or human interface devices (e.g., keyboard or mouse). It is to be understood that principles of the present invention may be applied in a wide variety of applications, and are not limited to those involving a DSS. Moreover, it is to be understood that implementations of the present invention may vary substantially in terms of complexity, in that some implementation may utilize relatively simple principles of cognitive science and/or vision science (e.g., human visual perception), while others may be of substantial complexity, drawing from multiple disciplines of the cognitive and vision sciences (e.g., human visual attention, memory, and text readability).

Display technology is becoming increasingly diverse such that there are significant differences in the types of displays that can be used to present content via a DSS. For example, the size, shape, brightness, and viewing conditions will, in general, vary greatly across a DSS. For example, some displays may be small, flexible and non-rectilinear, whereas others may be standard large-format LCD and plasma displays. This variation in display types and viewing conditions means that any single version of a piece of content will not be optimal for all the displays across a DSS.

In order to overcome this problem using a conventional approach, it would be necessary to generate unique versions of each piece of content for each unique display type and viewing environment, and to selectively distribute these unique versions of content to their corresponding displays in the network. However, it is not realistic to expect content designers to have such detailed knowledge of the display types and viewing conditions across a large network of displays. Furthermore, even if content designers had such detailed knowledge, it would be prohibitively time-consuming to manually create unique versions of content for each display and to manually schedule the content to play on each corresponding display at the appropriate time. Methods and systems of the present invention advantageously allow content designers without advanced training in the visual and cognitive sciences to apply principles from these disciplines during the content creation process and during content adjustment, such as during content distribution to a network of disparate displays, in order to improve content effectiveness.

According to embodiments of the present invention, the user may be prompted during the content creation process to input one or both of the goal and intended message for each piece of content to be presented. According to various embodiments, the system may assist the user in identifying key attributes of the DSS that have implications for content design. The system may further guide the user through the process of applying the cognitive and vision sciences to design content based on the goals and key DSS attributes. For example, the system may help users choose templates (e.g., best layout) and elements (e.g., whether elements should be graphical, text, involve movement, color, size, etc.) to display on the DSS displays.

According to other embodiments, systems and methods of the present invention may implement software that automatically generates new templates and applies transformations to existing content elements. New templates and content elements may be generated for various reasons, such as to improve the content effectiveness. Tools are preferably made available to the user that facilitate generation of unique versions of pieces of content for each display of the DSS. For example, software tools may be implemented that elicit input from a user and/or other software components regarding DSS attributes and other factors that underlie content effectiveness, and apply information from the cognitive and visions sciences (e.g., design rules or models accessed from a database) to extrapolate, fill in, and otherwise explore the information space for the particular pieces of content the system aims to improve or optimize. Systems and methods of the present invention provide a facility to generate completely new content that is not simply a reconfiguration of deployed templates or elements associated with deployed versions of content. That is, the systems and methods of the present invention need not rely solely on the hybridization/blending of deployed templates and elements that data suggest are effective, although such systems and methods are capable of hybridization/blending.

Turning now to FIG. 1, there is illustrated various processes associated with the development of content in accordance with embodiments of the present invention. The term content is a broad term that refers to a wide variety of informational content, including graphics, text, video clips, still images, audio clips, web pages, and/or any combination of video and/or audio content, for example. A piece of content refers to a specific set and configuration of images, videos, text elements, etc., that is meant to stand on its own to communicate a specific message or set of messages (e.g., a television commercial). The term content element refers to individual images, videos, text strings, etc., that can be combined to make specific pieces of content.

Each piece of content can have many versions. For example, two versions of the same piece of content could differ in that one version uses text to represent a concept whereas another version of that same piece of content might use an icon to represent the same concept. There can also be many versions of each content element. For example, one version of a text string could have 12-point font whereas the same text string could have 24-point font.

According to the embodiment of FIG. 1, content is developed 10 for presentation on a display. The development of the content, which includes content elements, is facilitated 12, by way of computer assistance. Specifically, design rules or models stored in a database are applied to 14 to facilitate computer-assisted development of the content. The design rules or models are preferably rules or guidelines that are based on principles of cognitive and vision sciences. The design rules/models allow a designer who has limited or no knowledge of principles of cognitive and vision sciences to create effective content that is consistent with such principles. The design rules/models stored in the database may be used to facilitate 16 computer-assisted adjustment of the content. The processes of generating content and revising content in a manner consistent with principles of cognitive and vision sciences are advantageously facilitated by computer assistance to enhance content effectiveness.

Figure 2:
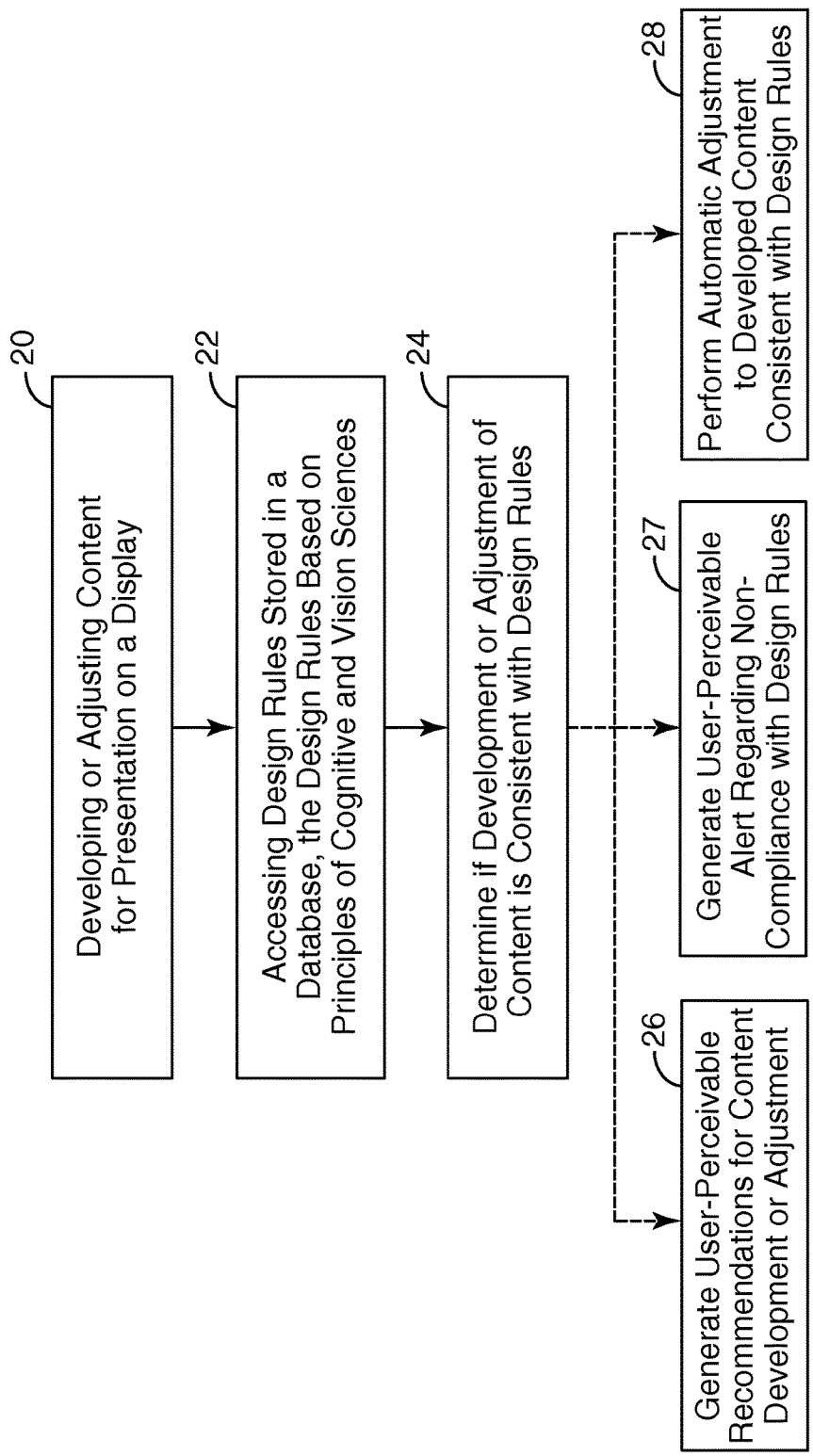
FIG. 2 illustrates various processes associated with the development of content in accordance with other embodiments of the present invention.

FIG. 2 illustrates various processes associated with the development of content in accordance with other embodiments of the present invention. According to the embodiment of FIG. 2, content is developed or adjusted 20 for presentation on a display. Design rules or models stored in a database are accessed 22 during content development or adjustment. The design rules are rules or guidelines that are based on principles of cognitive and vision sciences, as previously discussed. The models stored in the database are typically based on a combination of rules that are associated with a multiplicity of cognitive and vision sciences principles. A computational model of visual attention, for example, represents one such model that encompasses several principles of cognitive and vision sciences. One particular computation model of visual attention may be referred to as a saliency mapping model as is known in the art. Useful examples of saliency mapping models are disclosed in U.S. Patent Publication No. 2006/0215922 and in U.S. Pat. No. 7,130,461, each of which is incorporated herein by reference. It is understood that a wide range of cognitive and vision science models may be used in the context of the present invention, and are not limited to models of human visual attention as specifically discussed above. Such other models may include those that encompass human memory principles, for example.

A computer system, which accesses the database that stores the design rules or models, determines 24 if development or adjustment of the content is consistent with the design rules/models. Various operations may be performed in response to determining that the design rules have been violated. For example, a user-perceivable recommendation may be generated 26 to suggest changes the user can make during content development or adjustment to satisfy to the design rules or models. A user-perceivable alert may be generated 27 that indicates non-compliance with the design rules or models. Automatic adjustment to the developed content may be performed 28 to ensure that the content is consistent with the design rules or models. FIG. 2 illustrates several of many other possible events that can be triggered during development or adjustment of content if an inconsistency with the design rules/models has been detected. Compliance with the design rules/models can be made mandatory or permissive depending on the application and sophistication of the user.

Figure 3:
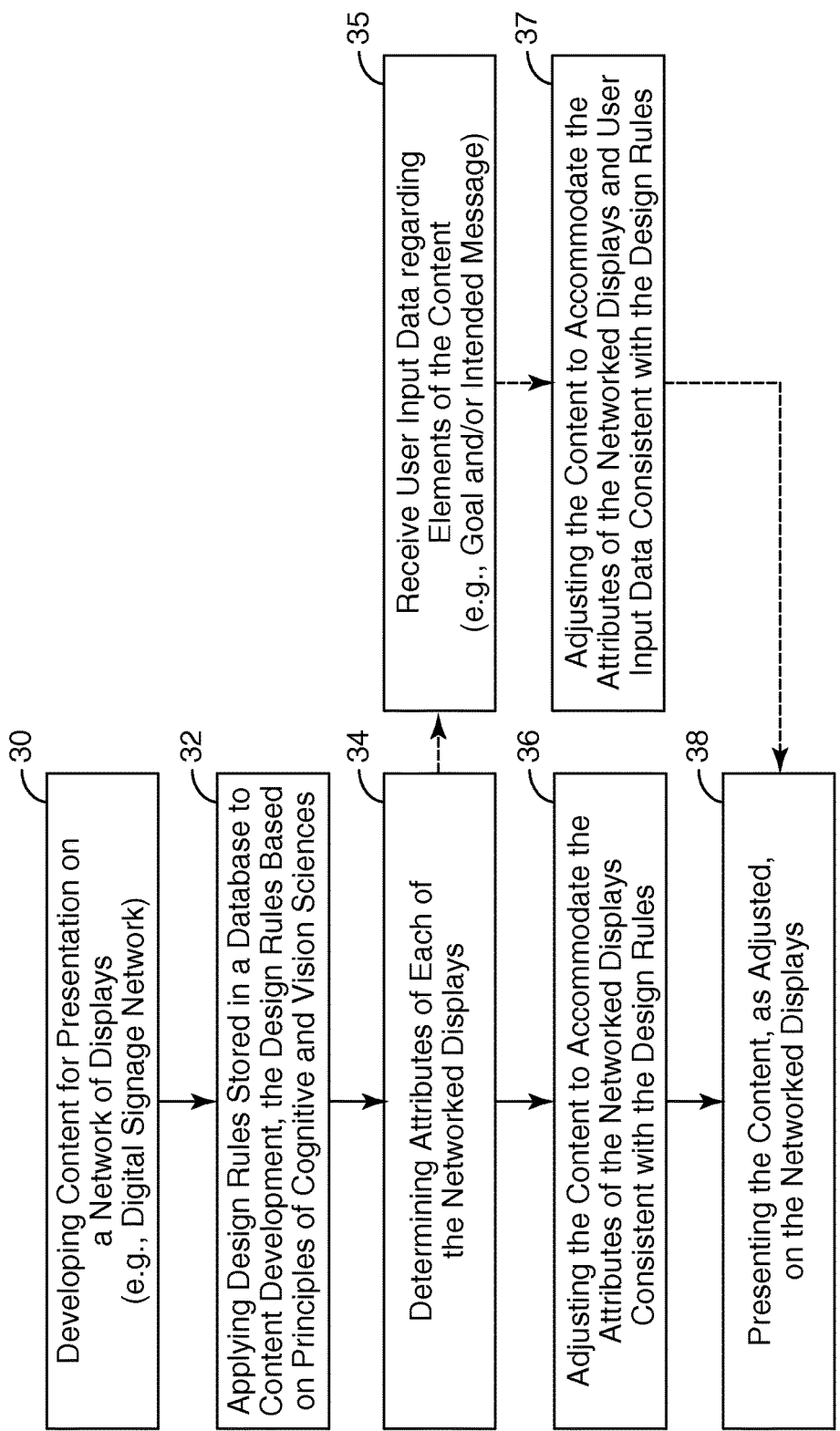
FIG. 3 illustrates various processes associated with the development of content in accordance with further embodiments of the present invention.

FIG. 3 illustrates various processes associated with the development of content in accordance with further embodiments of the present invention. According to the embodiment of FIG. 3, content is developed 30 for presentation on a multiplicity of displays, such as a network of DSS displays. The multiplicity of displays are preferably those associated with a DSS, but may be displays associated with any network of displays, such as home computer displays coupled to the internet. Design rules or models stored in a database are applied 32 during content development, the design rules/models based on principles of cognitive and vision sciences, as previously discussed.

Attributes of each display of the display network are determined 34. Such attributes typically include display type, size, shape, environment, ambient lighting, viewing distance, viewer passing speed, among others. These attributes are preferably determined in an automated manner, such as by reading attribute data stored in the display (e.g., determined and stored during display installation) or from a database that contains attribute information for each display. These attributes may also be determined using one or more sensors located at the viewing locations. A video camera, for example, may be installed at viewing locations to facilitate detection of changing environmental conditions, such as day/night changes, density of viewers, and distance between the viewers and the display. Proximity sensors, such as infrared (IR) sensors, may be used at viewer locations to determine the average number of viewers per unit time and/or average distance between the viewers and the display.

According to one approach, the content is adjusted 36 to accommodate the attributes of the networked displays in conformance with the design rules/models. For example, the attributes of a 8" display differ significantly from those of a large panel display (e.g., 50" LCD display). The content of a given presentation is preferably adjusted so that the content elements are presented 38 on each of the disparate displays in conformance with the design rules/models.

According to a further approach, as is also shown in FIG. 3, user input data is received 35 regarding elements of the content. The user input data preferably includes the goal and/or the intended message of each content element. The content is adjusted 37 to accommodate the attributes of the networked displays and the user input data in a manner consistent with the design rules/models. The adjusted content is presented 38 in an appropriate manner on each of the networked displays 38.

Figure 4A:
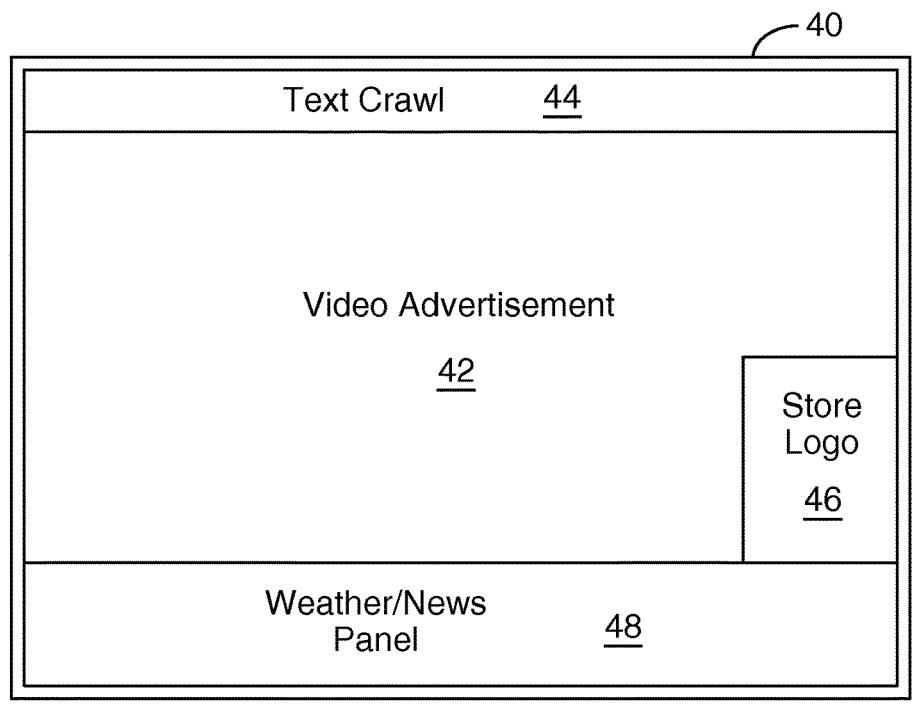
FIG. 4A depicts an initial attempt by a designer to create a presentation for display that includes a number of different content elements.
Figure 4B:
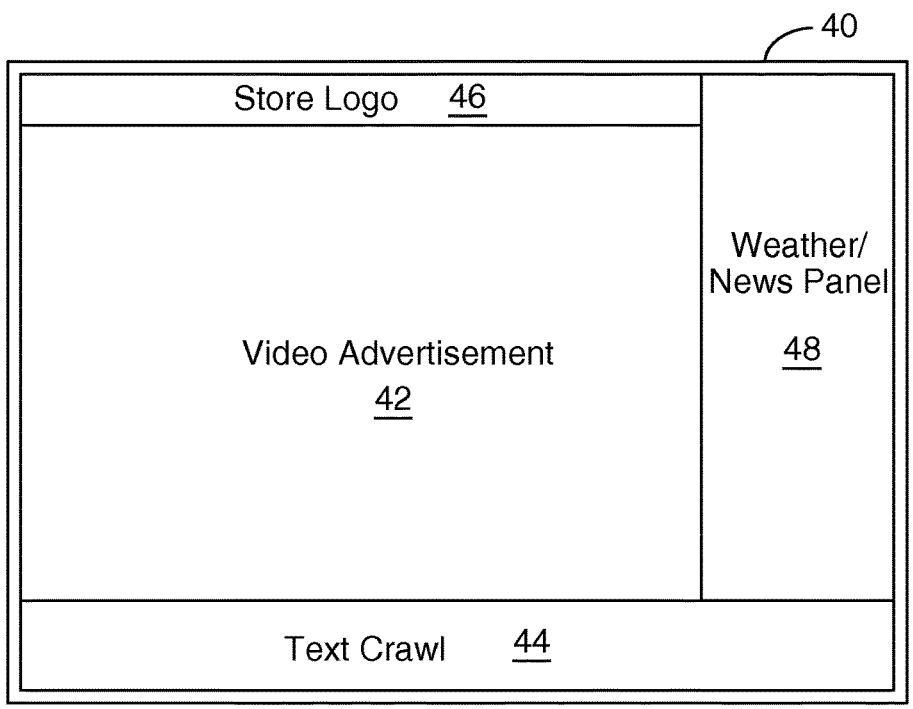
FIG. 4B illustrates how the developed content shown in FIG. 4A is more appropriately arranged in a manner consistent with design rules or models that are based on principles of cognitive and vision sciences in accordance with embodiments of the present invention.

FIGS. 4A and 4B illustrate how content development for presentation on a display 40 may be conducted in a manner consistent with design rules developed from principles of cognitive and vision sciences. FIG. 4A depicts an initial attempt by the designer to create a presentation for display that includes a number of different content elements. In this illustrative example, the designer has selected the following content elements for presentation on display 40: a text crawl 44, a video advertisement 42, a store logo 46, and a weather/news panel 48. Assuming that the designer is not well acquainted with principles of cognitive and vision sciences, the layout of these content elements 42, 44, 46, and 48 as shown in FIG. 4A represents what the designer believes to be an effective piece of content.

FIG. 4B illustrates how the developed content shown in FIG. 4A is more appropriately arranged in a manner consistent with design rules or models developed from principles of cognitive and vision sciences. The locations and size of the content elements 42, 44, 46, and 48 shown in FIG. 4B have been changed in accordance with design rules/models developed from principles of cognitive and vision sciences. Aspects of the content elements other than, or in addition to, location and size relative to the display 40 may be modified as well, such as font of text, text orientation, foreground and background colors, color intensity, proportion of the content elements relative to one another, relative brightness, among others. Adjustment of the content elements may be implemented in a semi-automatic or fully automatic manner via computer assistance.

FIG. 5 is a block diagram of a system for implementing computer-assisted development of content using principles of cognitive and vision sciences in accordance with embodiments of the present invention. The system shown in FIG. 5 includes a processor 52 coupled to a user interface 54 and a display 56. The user interface 54 preferably includes one or more user input devices, such as a keyboard, mouse, voice recognition facility, and the like. A presentation 58 of content developed in accordance with the present invention is typically presented on the display 56. Content of the presentation 58 is preferably created and revised in accordance with design rules or models stored in a cognitive sciences database 50. Various templates (e.g., layouts) that are consistent with the design rules/models may also be stored in the cognitive sciences database 50. It is understood that the cognitive sciences database 50 typically stores information, such as design rules, templates, and models, that is associated with both cognitive science and vision science, and that the use of the term cognitive sciences database is not exclusive to cognitive science only.

FIG. 6 is a block diagram of a system for implementing computer-assisted development and/or distribution of content in a manner consistent with principles of cognitive and vision sciences in accordance with embodiments of the present invention. The system shown in FIG. 6 includes a processor 62 coupled to a user interface 64, a display 66, a cognitive sciences database 50, and a network interface 70.

The network interface 70 facilitates communication between the processor 62 and a multiplicity of displays 80A-80N of a DSS. The processor 62 applies design rules accessed from the cognitive sciences database 50 to format content in a manner tailored for each of the displays 80A-80N, at least some of which have differing attributes. The effectiveness of the presentations 82A-82N distributed to the various displays 80A-80N is enhanced by adjustments made to the content by application of the design rules, models, and templates stored in the cognitive sciences database 50, in view of attributes of the DSS. The effectiveness of the presentations 82A-82N distributed to the various displays 80A-80N may be further enhanced by modification of the content elements in view of user-indicated goals and intended message.

Figure 7:
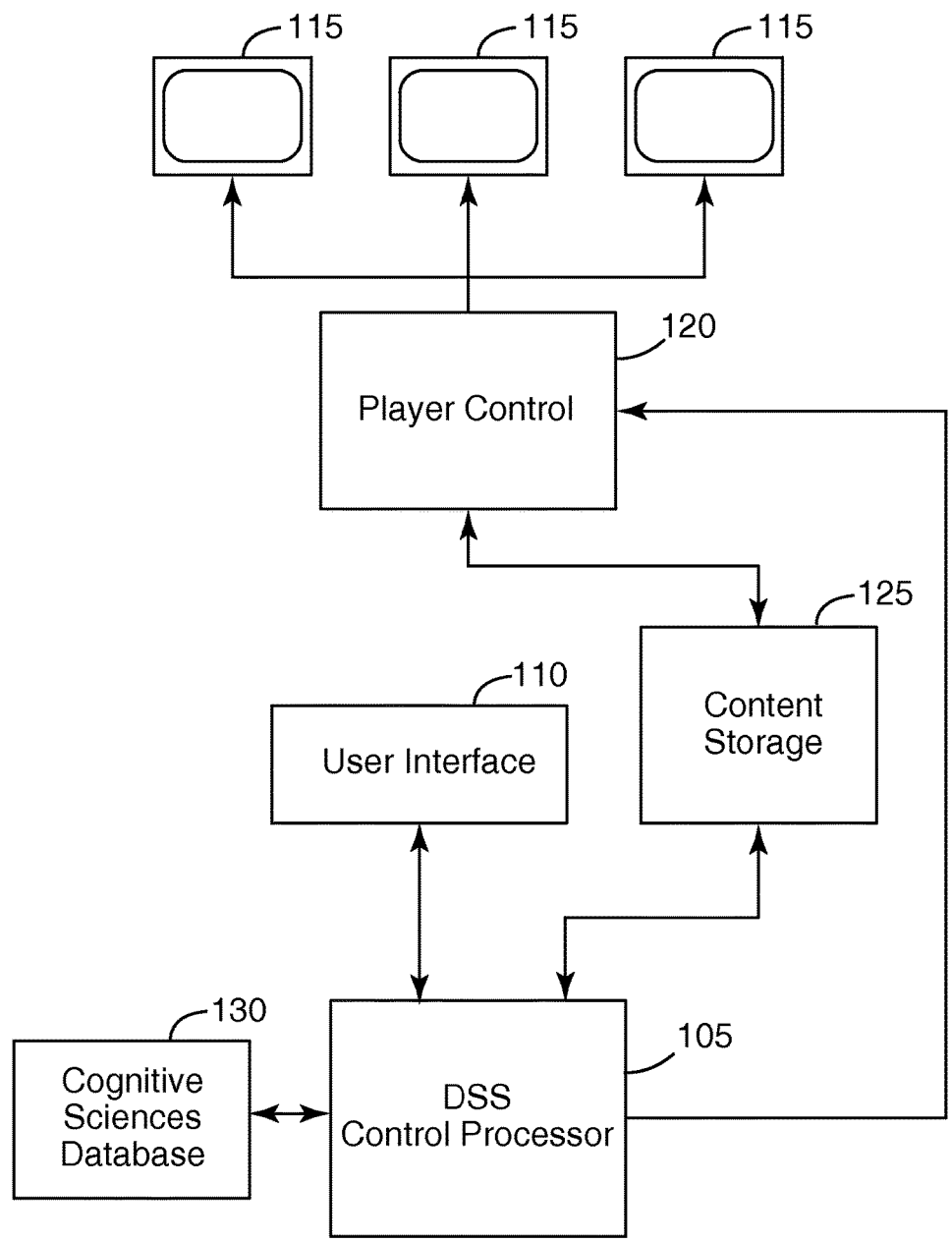
FIG. 7 is a block diagram of a digital signage system that incorporates the capability for developing and distributing content in accordance with embodiments of the invention.

FIG. 7 is a block diagram of a DSS that incorporates the capability for developing and distributing content in accordance with embodiments of the invention. The block diagram of FIG. 7 illustrates one configuration of a DSS divided into functional blocks. Those skilled in the art will appreciate that the DSS may be alternatively illustrated using different function blocks and that various components of the DSS may be implemented as hardware, software, firmware, or any combination of hardware, software and firmware.

The DSS illustrated in FIG. 7 is a computerized system configured to present informational content via audio, visual, and/or other media formats. The DSS may include functionality to automatically or semi-automatically generate playlists, which provide a list of the information content to be presented, and schedules, which define an order for the presentation of the content. In a semi-automatic mode, a user may access a DSS control processor 105 via an interactive user interface 110. Assisted by the DSS control processor 105, the user may develop content by identifying content elements to be presented, preferably in accordance with design rules stored in a cognitive sciences database 130. The DSS control processor 105 may then be used to generate playlists and schedules that control the timing and order of presentations on one or more DSS players 115. Each player 115 presents content to recipients according to a playlist and schedule developed for the player 115. As discussed previously, the informational content may comprise graphics, text, video clips, still images, audio clips, web pages, and/or any combination of video and/or audio content, for example.

In some implementations, after a playlist and schedule are developed, the DSS control processor 105 determines the content required for the playlist, downloads the content from a content server, and transfers the content along with the playlist and schedule to a player controller 120 that distributes content to the players 115. Although FIG. 7 shows only one player controller 120, multiple player controllers may be coupled to a single DSS control processor 105. Each player controller 120 may control a single player 115 or multiple players 115. The content and/or the playlists and schedules may be transferred from the DSS control processor 105 to the one or more player controllers 120 in a compressed format with appropriate addressing providing information identifying the player 115 for which the content/playlist/schedule is intended. In some applications, the players 115 may be distributed in stores and the content presented on the players 115 may be advertisements.

In other implementations, the DSS control processor 105 may transfer only the playlists and schedules to the player controller 120. If the content is not resident on the player controller 120, the player controller 120 may access content storage 125 to acquire the content to be presented. In some scenarios, one or more of the various components of the DSS system, including the content storage 125, may be accessible via a network connection, such as an intranet or Internet connection. The player controller 120 may assemble the desired content, or otherwise facilitate display of the desired content on the players according to the playlist and schedule. The playlists, schedules, and/or content presented on the players 115 can be modified periodically or as desired by the user through the player controller 120, or through the DSS control processor 105, for example. Such modifications can be made in accordance with design rules, models or templates stored in the cognitive sciences database 130.

In some implementations, the DSS control processor 105 facilitates the development and/or formatting of a program of content to be played on a player. For example, the DSS control processor 105 may facilitate formatting of an audiovisual program through the use of a template. The template includes formatting constraints and/or rules that are applied in the development of an audiovisual program to be presented. For example, the template may include rules associated with the portions of the screen used for certain types of content, what type of content can be played in each segment, and in what sequence, font size, orientation, and/or other constraints or rules applicable to the display of the program. A separate set of rules and/or constraints may be desirable for each display configuration. These rules, templates, and constraints (e.g., design rules/models/templates) are preferably stored and accessed from the cognitive sciences database 130. In some embodiments, formatting a program for different displays may be performed automatically by the DSS control processor 105 in accordance with the design rules, models, and templates.

The information stored in the cognitive sciences database 130 may be used automatically or semi-automatically to control, adjust, and/or monitor one or more processes of the DSS including creation of templates, content design, selection of content, distribution of content, assembly of programs, and/or formatting of programs for display. The cognitive sciences database 130 used in conjunction with the programming of the DSS yields advertisements or other digital signage programs that are enhanced by the teachings of cognitive science, while relieving the system user from needing specific training in the field.

In development of a digital signage program, e.g., ad campaign or the like, the DSS control processor 105 may guide a user through various processes that are enhanced using knowledge acquired through the cognitive sciences. For example, information stored in the cognitive sciences database 130 may be applied to the choice of templates to produce an optimal program layout and/or to the selection of content, such as whether content elements should be graphical, text, involve movement, color, size, and/or to the implementation of other aspects of program development. The DSS preferably includes the capability for designing alternative versions of a digital signage program to accommodate diverse display types and viewing conditions in a manner consistent with the information stored in the cognitive sciences database 130.

Figure 8:
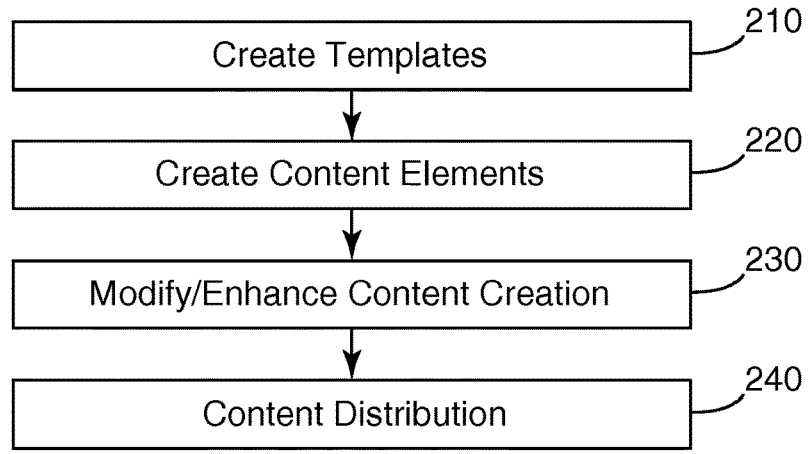
FIG. 8 illustrates the process flow of creating and deploying content using the components and functionality of the digital signage system shown in FIG. 7.

FIG. 8 illustrates the process flow of creating and deploying content using the components and functionality of the DSS described above. The process guides the user through a series of tools and scripts, and creates 210 a number of alternative templates that specify how categories of content elements might appear on the screen (e.g., the location, size, and orientation of elements such as text, graphics and videos). The tools and scripts suggest recommended templates by drawing on three sets of information: a) principles from the cognitive and vision sciences regarding effective display of information, b) the goals for the content (e.g., way-finding, advertising), and c) the known attributes of the digital signage network (e.g., size and shape of the different displays, different viewing distances, and viewer demographics across the network).

For example, the tools and scripts might help a user determine whether an element should be represented graphically or via text. The tools and scripts might also help a user determine which of a large number of pre-defined templates are appropriate given the viewing conditions across the network, goals for the content, and if available, metrics regarding the types of templates that have been effective from previous campaigns. The tools and scripts might further help a user determine whether target and distractor elements of the content are properly positioned, dimensioned or otherwise presented (e.g., proper color, intensity, etc.), and whether the desired order of target attention/recognition by the viewer is achievable given the state of the content.

The process walks the user through a series of tools and scripts to generate 220 the particular content elements that will later be placed within the templates created at block 210. The individual content elements can include specific text messages, static images, animations, movie clips, sound bites, etc. Each element could have many variants, and software helps the user determine which elements of content can be combined within a template, the rules for how those elements can be combined, and the parameters on which the content elements can be manipulated during the content creation process. For example, it may be legal to change the color or color intensity of a font during deployment, but not the color of the face of a famous person used in the template.

The software tools and scripts may facilitate content generation by drawing on multiple sets of information, including: a) data regarding the types of content elements that were effective in previous campaigns, b) principles from the cognitive and vision sciences, and c) the known attributes of the digital signage network. After the content is created, in this example, user interaction is no longer necessary.

Content creation is enhanced at block 230. The process may involve various constraints to combine elements and templates to create a number of versions of content. The first time through this process, the constraints may be based on: a) the factors previously used in creation of templates and content elements above, b) pre-programmed guidelines for how to combine elements and templates, and c) goals for the piece of content being deployed. On subsequent passes through this block, the process may also use effectiveness data (e.g., sales or inventory data, data resulting from performing true or quasi-/correlational experimentation) to alter existing content/templates or create novel templates (through interpolation) and elements before creating new versions of content. Because each display in a network may have different attributes (e.g., different lighting levels, noise levels, shape, size, and mean viewing distances), a unique version of content may be created for each display in the network. The content is distributed 240 across the digital signage network, with adjustments made thereto in view of the DSS/display attributes.

Figure 9:
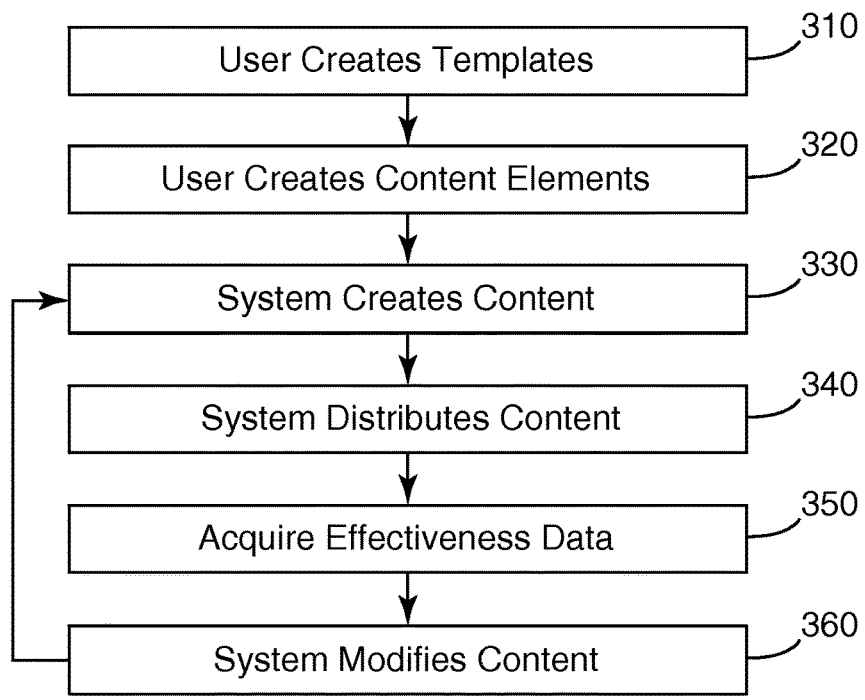
FIG. 9 is a flowchart illustrating an exemplary implementation of a digital signage system in accordance with embodiments of the present invention.

FIG. 9 is a flowchart illustrating an exemplary implementation of the DSS system in accordance with an embodiment of the invention. The implementation involves a sporting goods retailer with 200 stores. The retailer desires to advertise four overstocked products and four products that are not overstocked but that have higher profit margins than the overstocked products. The goal of the campaign is to maximize gross profit while eliminating excessive inventory of the overstocked items. That is, once the excessive inventory is eliminated, the goal will simply reduce to maintaining a balanced inventory at each store location.

Using cognitive/vision science driven software, the signage manager of the retailer creates 310 a number of different templates that will be used to develop content for each of the eight product lines. These templates include layout of messages, color schemes, and/or other variables that make up the program. These templates can be used for each of the eight product lines, and are not specific to a single product. Additionally, pre-existing or stock templates are available for use during this phase.

After creating the base templates for this campaign, the signage manager creates 320 individual content elements that are needed to populate the templates. The individual elements are specific to the product lines being promoted, and include product branding and messages for given products. As in the template creation process, creation of individual elements is guided by software wizards using cognitive/vision science driven software.

The templates are automatically populated 330 with the individual content elements to generate a number of different content packages for each of the eight products that the signage network is promoting. Potentially hundreds of differing versions of each content piece are created for each product line by merging elements with templates to accommodate varying signage attributes such as screen size or viewing distance.

Using pre-existing or learned knowledge about the signage network, content is distributed 340, such as by using algorithms that enable collection of success metrics for individual pieces of content. According to some implementations, the content is distributed across the network in a way that ensures proper counterbalancing, blocking, and confound-free measurement can be made (e.g., in conformance with performing a true experiment). Additionally, the deployment algorithm ensures that relevant content is sent to the appropriate signs in the network, considering network attributes, viewer demographics, and viewing conditions among others.

In some implementations, point of sale and sensor data is used which allows the impact of the various content packages to be monitored and analyzed to determine what templates and content elements, and their combinations, are most effective for each screen on the network. From this information, cause and effect, as well as return on investment can be analyzed, enabling value-based billing. This example may determine whether across all 200 stores, the signage system itself was responsible for X % increase in profits and Y % decrease in excessive inventory. Exploratory data analysis generates new possible network attributes. For example, there is a spike in sales when customers pick up product X and when content Y is concurrently shown. On the next iteration, this new network attribute will be tested experimentally, not just measured from a correlation study. For example, the system may determine whether content pieces presented on X type screens is most effective using Y-type templates, and that the most effective content elements have XYZ properties.

Based on effectiveness data that may be acquired automatically (e.g., via true experiments implemented by the signage network) or manually (e.g., sales information, inventory levels) 350, the system may automatically generate 360 new templates, new content elements, and new combinations thereof. Again, using signage network attributes (both old and new), the software deploys these new pieces of content across the network. During the remainder of the campaign, the processes described in blocks 330 through 360 may be repeated, for example, without user interaction. The signage network manager is able to monitor the impact that the content has on sales at any given point during the campaign while the system automatically attempts to achieve the campaign goals.

Upon completion of this campaign, templates and elements that were manually or automatically generated during the campaign are available for future campaigns as well. Furthermore, the knowledge that was gained regarding the types of templates and elements that are effective for particular displays, demographics, or other factors, is used to create and distribute content more effectively across the network during future campaigns.

Determination of whether an experiment is a true experiment can be performed proactively or retroactively with respect to running the experiment. According to some embodiments, a computer may be used to determine if an experiment that is yet to be performed is a true experiment. According to other embodiments, a computer may be used to determine if an experiment that was previously performed is a true experiment. According to one approach, the computer determines, based on information provided by the user, whether an experimental design eliminates or controls confounds. In this example, the user enters information about the experiment, including the independent and dependent variables of the experiment.

The computer identifies situations that may produce confounds in the experiment. The user selects the confound-producing situations identified by the computer that are present in the context of the experiment. The computer prompts the user to identify steps taken to eliminate or control the identified confounds. The computer determines if the combination of steps is sufficient to eliminate confounds in the experiment. Details of performing a true experiment in the context of the present invention are further disclosed hereinbelow and in commonly owned U.S. patent application Ser. No. 11/321,340, filed Dec. 29, 2005, which is hereby incorporated herein by reference.

Figure 10:
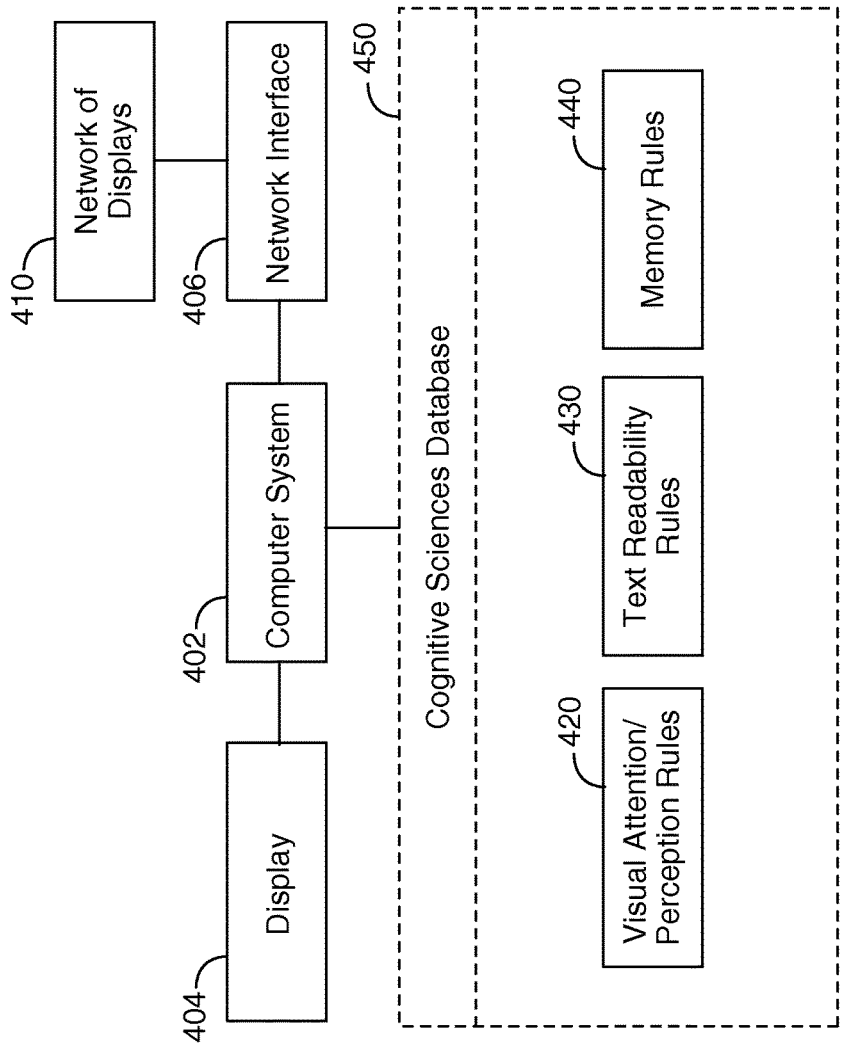
FIG. 10 is a block diagram of a system for developing and/or distributing content using cognitive/vision science driven software in accordance with embodiments of the present invention.

FIG. 10 is a block diagram of a system for developing and/or distributing content using cognitive/vision science driven software in accordance with embodiments of the present invention. The system shown in FIG. 10 includes a computer 402 coupled to a display 404 and a network interface 406. The network interface 406 is coupled to a network of displays 410, such as those of a DSS. The computer system 402 is also coupled to a cognitive sciences database 450.

The cognitive sciences database 450 includes several sets of rules or models each developed from principles of human cognitive and vision sciences. In this illustrative example, the rules and models, also referred to herein as design rules or design models, include visual attention and perception rules 420, text readability rules 430, and memory rules 440.

The visual attention and perception rules 420 may include rules or models that are based on how human perceptual systems process visual information. An illustrative example of a visual attention and perception model 420 is referred to as a saliency mapping model. In general terms, those portions of a given image which elicit a strong, rapid and automatic response from viewers, independent of the task they are trying to solve, may be referred to as being visually salient. A red object among green objects or horizontal lines among vertical lines represent two examples of such salient locations of an image.

The computer system 402 may be configured to provide for automatic detection of salient parts of image information based on a saliency mapping model. Saliency may be computed in a number of ways as is known in the art. Examples of such approaches which may be implemented in the context of the present invention are disclosed in U.S. Patent Publication No. 2006/0215922 and in U.S. Pat. No. 7,130,461, which are incorporated herein by reference hereinabove. Further details of saliency mapping models are described in Koch, C. and Ullman, S. "Shifts in Selective Visual Attention: Towards the Underlying Neural Circuitry," Human Neurobiology, 4:219-227, 1985; and two detailed computer implementations: Itti, L., Koch, C. and Niebur, E., "A Model of Saliency-Based Visual Attention for Rapid Scene Analysis," IEEE Trans. Pattern Analysis & Machine Intell. (PAMI) 20:1254-1259, 1998 and Itti, L. and Koch, C. "A Saliency-Based Search Mechanism for Overt and Covert Shifts of Visual Attention," Vision Research 40:1489-1506, 2000, each of which is hereby incorporated herein by reference.

According to one approach, the system shown in FIG. 10 may be configured for determining a saliency map, which may be a two-dimensional map that encodes salient objects in a visual environment. The saliency map of a given scene, for example, expresses the saliency of all locations in this image. The saliency map is the result of competitive interactions among feature maps for image features including color, orientation, texture, motion, and depth, among others, that interact within and across each map. At any time, the currently strongest location in the saliency map corresponds to the most salient object. The value in the map represents the local saliency of any one location with respect to its neighborhood. By default, the system directs attention towards the most salient location. A second most salient location may be found by inhibiting the most salient location, causing the system to automatically shift to the next most salient location.

By way of example, original content may be input to a saliency mapping model, such as in the form of a scanned or digitized image of the original content. The computer system 402 may produce a saliency map of the content image, indicating the most salient locations of the image preferably in order. The output of the saliency mapping model may indicate these salient locations using a box or other shape in combination with a number or letter, thus indicating the locations and order of saliency of the image. These locations/order indicators can be used to provide a comparison between the content designer's intended saliency locations/ordering and the actual saliency locations/ordering as determined by the computer system 402.

The computer system 402 may generate recommendations to the designer via narrative or imagery output that can improve saliency and/or achieve the desired saliency/ordering of salient locations. The computer system 402 may alternatively produce altered forms of the original content automatically in a manner that achieves the designers desired saliency mapping/ordering requirements. In this manner, the computer system 402 may, without user intervention, analyze original content, develop a saliency map therefrom, determine if saliency requirements of the user or rule/model have been met, and, if not, generate one or more versions of adjusted content that meets the saliency requirements of the user or rule/model.

Other visual attention/perception rules 420 may be defined for visual attention guiding attributes that can enhance the visual attention of viewers to displayed content, effectively "guiding" the viewers to allocate attention to the display or portions of the display. Guiding attributes define aspects of individual content elements or relationships between multiple content elements. Guiding attributes can be used in a first mode, to attract the visual attention of viewers to a display, and be used in a second mode, during presentation of content once the viewer is present within the display space. For example, a rule may be defined that regulates the number and spatial combination of specific strong guiding attributes that are present in the displayed content at any moment in time in order to maximize the attractiveness of the displayed content to the viewer, given the specific combination of strong attributes that exist in the visual environment in which the display is located. Once the visual attention of the viewer has been attracted and is within the display space, as indicated by a camera or proximity sensor, for example, the rule may allow for the combination of both strong and weak guiding attributes, or allow use of combinations of strong and weak attributes for guiding the viewer's visual attention within the display content.

It is understood that there are two categories of guiding attributes, strong and weak guiding attributes. Strong guiding attributes include: size, color, orientation, motion, curved vs. straight, stereoscopic depth, aspect ratio, monocular depth, and line termination. Weak guiding attributes include: novelty, intersection, color changes, semantic category, and faces.

A rule 420 may be defined that limits the number of strong guiding attributes present in the display of content at any given time. It is understood in the art that the presence of greater than a small number of instances (e.g., four instances) of any one strong guiding attribute in a content presentation at any given time weakens the "strength" of this strong guiding attribute with respect to guiding visual attention. The computer system 402 may be configured to track strong and, optionally, weak guiding attributes in a visual array of content presented on a display at any given time. If greater than 4 instances of any one of the strong guiding attributes are detected at any given time, the computer system 402 may alert the designer or take automatic corrective action by modifying the content to eliminate the duplicative strong guiding attribute(s) in excess of 4 or other numeric threshold.

In another illustrative example, it is assumed that the content designer wishes to increase the likelihood that newly added content be seen by the viewer. The computer system 402 may scan the content to determine the identity and number of strong guiding attributes already used in the content, and recommend use of an unused (or least used) strong guiding attribute to draw attention to the newly added content element. In another illustrative example, the environment may be evaluated, such as by use of a camera or other sensors, to determine the type and number of strong guiding attributes present in the display environment. Based on this environmental knowledge, the computer system 402 may recommend alteration (or automatically alter) of the content so that the combined number of strong guiding attributes present in the content at any one time and in the display environment at the same time does not exceed the "maximum number of strong guiding attributes" threshold discussed above. This content may be adjusted dynamically by the computer system 402 in view of both content and display environmental visual attributes to increase the effectiveness of content display.

Text readability may be defined in terms of one or more design rules or a model. For example, text readability may be defined in terms of several parameters, including text size, reading speed (based on moving text and/or speed of moving viewer, viewer dwelling time), font style, luminance, contrast, color, and viewing distance, among others. According to one approach, a minimum font or text size as a function of text contrast may be defined as:

$$\text{font size} = 7.434 * \exp(-\text{contrast}/0.6297) + 5.028,$$

where font size is given in angular size (arc min.), and contrast represents text contrast defined as $(L_t - L_b)/L_b$, where $L_t$ is the text luminance and $L_b$ is the background luminance. Additional details of this model are described in Krebs, W. and Ahumada, Jr., A, "A Simple Tool for Predicting the Readability of a Monitor," Proceedings of the Human Factors and Ergonomics Society 46$^{th}$ Annual Meeting—2002, pp. 1659-1663, which is hereby incorporated herein by reference. The computer system 402 may be configured to measure font size of content text and determine if the minimum font size of such text as defined above is met. If not, the computer system 402 may indicate violation of this rule and/or alter the text in a manner that satisfies the font size rule. Other text readability parameters may similarly be determined and adjusted by the computer system 402.

For example, as sensor or data from other sources regarding the distances of viewers relative to a display is acquired, the system may automatically adjust the text size to improve readability according to the distance information. Font size, which is measured in retinal arc minutes, may be adjusted systematically in relation to changes in viewer distances from the display to maintain readability according to the equation above.

Memory rules or models 440 may also be implemented by the computer system 402 to enhance viewer coding (e.g., visual, phonological, and/or semantic coding), retention, and recall. Rules regarding working and long-term memory may be defined and implemented by the computer system 402. Memory rules 440 may be developed for meeting particular goals, such as the goal of viewers comprehending a comparison of information and remembering desired information resulting from the comparison.

It is well understood that the duration of human working memory without rehearsal is about 2 seconds. In other words, absent rehearsal or repetition, information in working memory can be lost in about 2 seconds. It is assumed, in this illustrative example, that a content designer wishes to design content such that a viewer encodes a first piece of information in working memory and also wishes that the viewer retain this first piece of information in working memory when a second piece of information is presented. In order to ensure that the first piece of information is not lost prior to presentation of the second piece of information, a memory rule 440 may ensure or recommend that the second piece of information be presented within 2 seconds of presentation of the first piece of information.

For example, the content designer may have the goal of presenting a comparison of a client bank's interest rate and that of a competitor bank. In order to ensure that the two interest rates are retained in working memory for the comparison, the second of the two interest rates is to be presented within 2 seconds of presentation of the first interest rate, per the working memory duration rule 440.

Principles of primacy and recency may also be defined in terms of memory rules 440. For example, the computer system 402 may be configured to order or re-order presentation of a sequence of information in a manner that increases the likelihood that the more important information in this sequence is transferred to long-term memory. For example, a sequence, series or pattern of information may be presented in an advertisement for display. The information may be text or graphic objects, such as numbers, letters, icons, pictures (e.g., of product on sale) or other information. Primacy and recency memory rules 440 may be applied that order or re-order the informational objects so that the more important objects are preferentially positioned at the beginning and end of the sequence, with the less important (e.g., less profitable) informational objects being positioned in the middle portion of the sequence, series or pattern.

The principle of rehearsal may also be defined by one or more memory rules 440. For example, a more important product of several products may be shown more frequently than other less important products. In this way, rehearsal or repetition of presentation of the more important products in an advertisement increases the likelihood that the more frequently presented products will be remembered by the viewer.

The principle of memory capacity may be defined in terms of one or more memory rules 440. It is understood in the art that the capacity of working memory is about four "chunks" of information. A "chunk" of information represents anything that has a unitary representation in long-term memory. Four chunks may be represented by four letters or numbers that have little association. However, a multiplicity of letters, numbers, objects, and the like that have a strong association may define a chunk. For example, the acronym NATO is formed from multiple letters, but is defined as a chunk, as NATO has a unitary representation in long-term memory to most adults, for example.

A memory rule 440 may be defined that limits the number of chunks that are presented at any given time in order to maximize the likelihood that the presented chunks are processed by the viewer and transferred to long-term memory. For example, the computer system 402 may scan for chunks and notify the content designer if greater than four chunks have been presented at any given time.

These and other principles of cognitive and vision sciences may be defined in terms of rules or models, including those described in Goldstein, E. Bruce, "Cognitive Psychology, Connecting Mind, Research, and Everyday Experience," Thompson/Wadsworth 2005, which is hereby incorporated herein by reference.

As was discussed previously, the complexity of the cognitive sciences database may vary from relatively simple to very complex. It is understood that the rules and models shown in FIG. 10 are for illustrative purposes only, and that a cognitive sciences database of the present invention may incorporate one or more aspects of one or more of these rules and models. These and other rules and models may be developed that associate a particular cognitive/vision science principle or set of principles to a content development rule or model that can be implemented by a computer to detect or ensure adherence to such rule/model. Those skilled in the art will appreciate that cognitive/vision science principles other than, or in addition to, those described herein may be incorporated into a cognitive sciences database for use in content development and distribution in accordance with the present invention.

Figure 11:
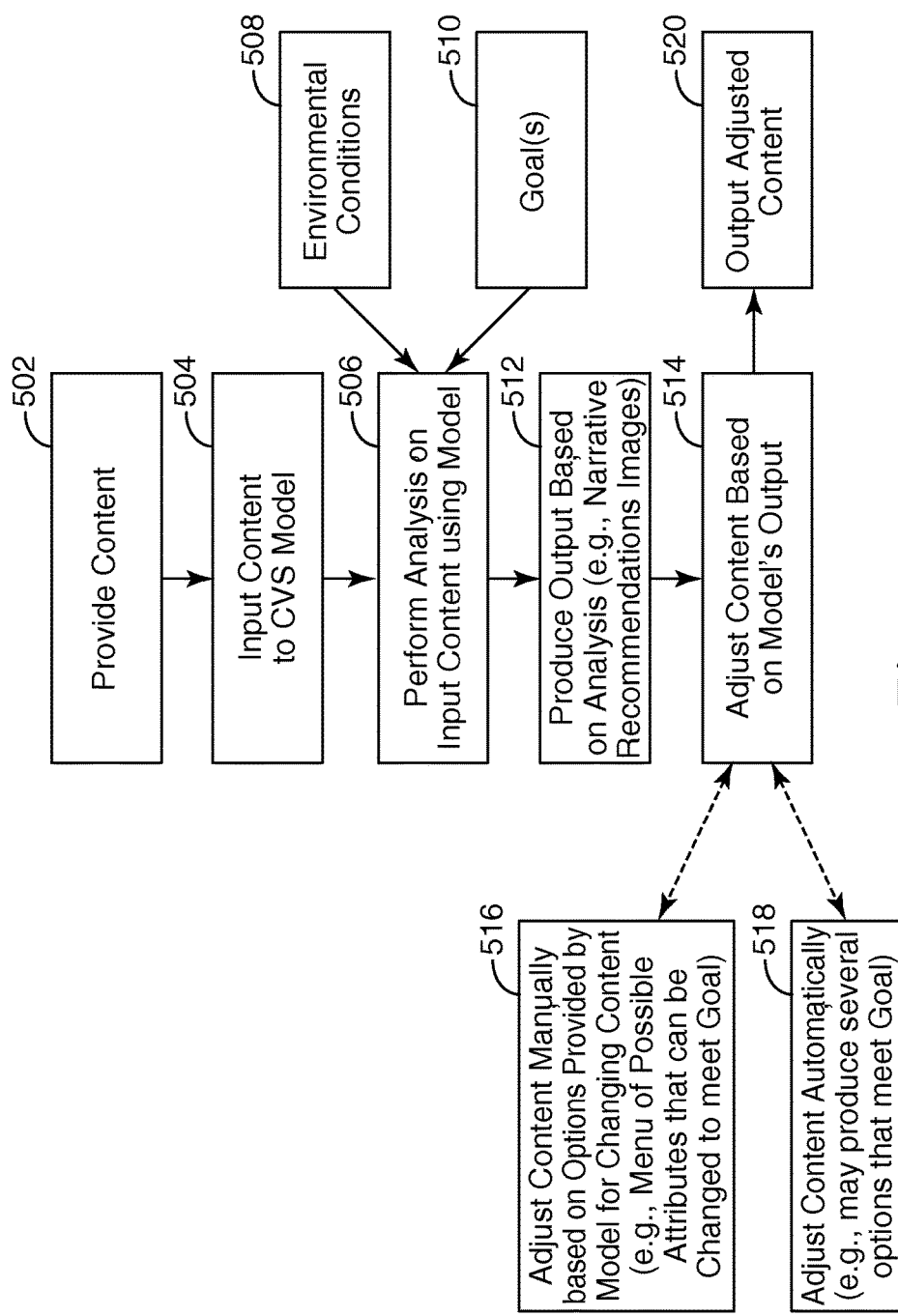
FIG. 11 is a flowchart illustrating various processes associated with content development and modification using one or more cognitive/vision sciences models in accordance with the present invention.

FIG. 11 is a flowchart illustrating various processes associated with content development and modification using one or more cognitive/vision sciences models in accordance with the present invention. FIG. 11 is directed to methods that provide for computer-assisted analysis of content by one or more cognitive and vision sciences (CVS) models. Content is provided or developed 502 by a content designer. The content is input 504 to a computer system that implements one or more CVS models, such as a computational model of visual attention, a text readability model or a model of human memory. The CVS model or models perform an analysis 506 on the content and produce 512 an output based on the analysis results. Information representative of environmental conditions at the presentation locations and/or goals for the content may be inputs 508, 510 to the model(s). For example, the type and configuration of displays, average distances between displays and viewers, average speeds or dwelling times as between viewers and displays may be environmental condition information 508 that is input to the model(s).

Goal information 510 that may be input to the model(s) may include goals that are associated with each of the various models, such as a computational model of visual attention, a text readability model or a model of human memory. Typical goal information may include saliency mapping goals, such as specific elements of the content to be perceived by viewers and the desired order in which such specific elements are to be perceived. Other goal information 510 may include improving or optimizing text readability based on text size and/or scrolling text rate relative to viewer location and/or speed at which viewers pass by a given display. Additional goal information 510 may include maximizing memory coding, retention, and/or recall of content by viewers, such as by conforming to memory capacity and duration rules of a given model.

In some implementations, the output represents recommendations for changing 516 the content in conformance with a given model's rules or goals. The recommendations may take several forms, such as a narrative form or images. For example, a menu of possible attributes of the content that may be changed 514 can be presented to the user. The menu of attributes may include a range of attribute values that may be changed by the user, yet still conform with a given model's rules or goals.

In other implementations, the output represents a modified form of the original content produced automatically 518 by the computer implemented CVS model or models. A number of variations of modified content may be automatically produced, each of which satisfies the rules or goals of the model or models. The user may then select a desired version of the modified content 514 for presentation 520. Alternatively, the computer may select one or more of the versions for presentation. In other implementations, the various versions of modified content may be subject to a designed experimental process that improves or optimizes content presentation effectiveness for a number of networked displays, preferably on a display-by-display basis, as is discussed in greater detail with reference to FIG. 12 below.

Figure 12:
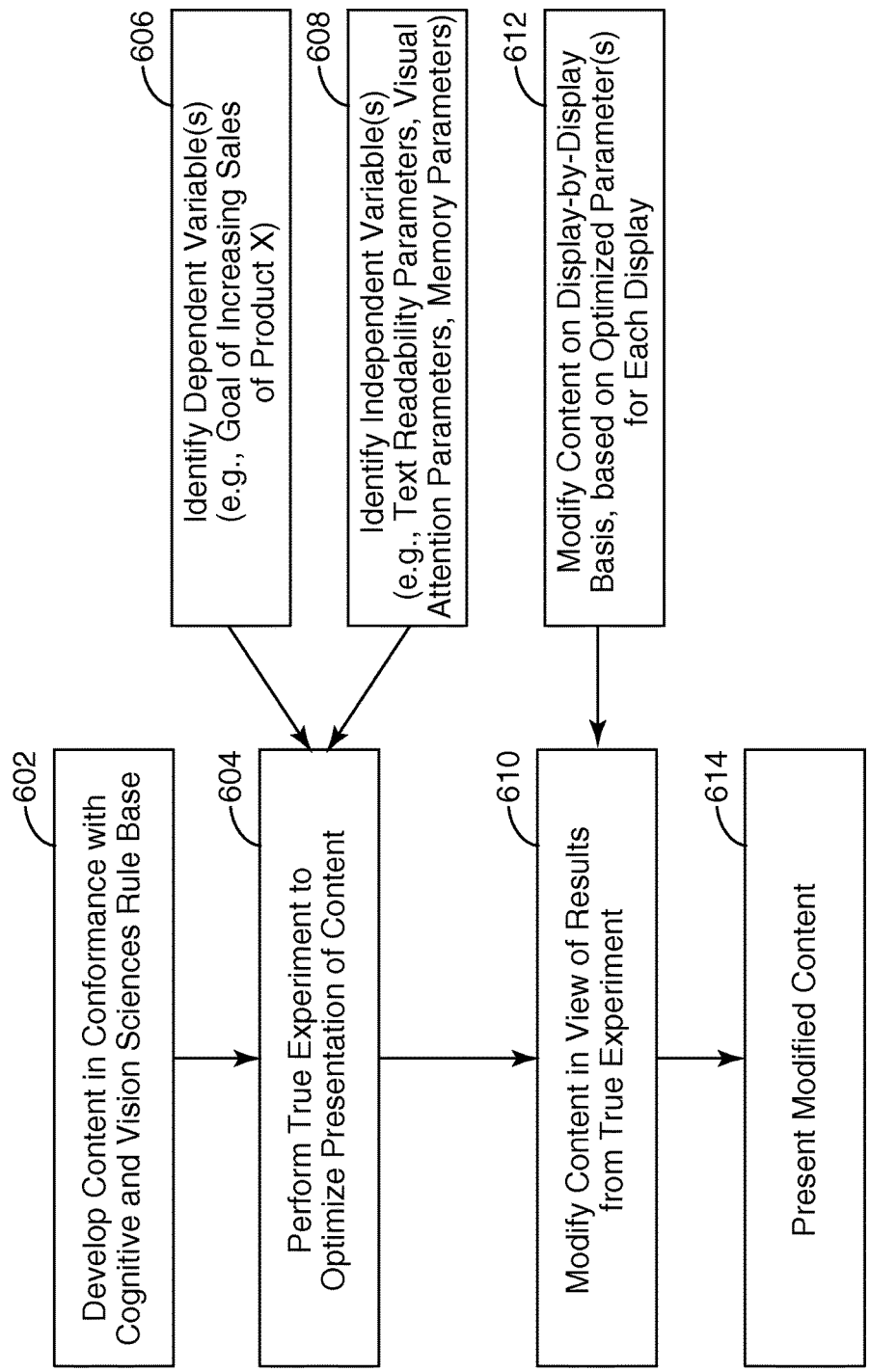
FIG. 12 is a flowchart illustrating various processes associated with content development and modification of same using one or more cognitive/vision sciences models and results from true experimentation preferably implemented by a digital signage system in accordance with the present invention.

FIG. 12 is a flowchart illustrating various processes associated with content development and modification of same using one or more cognitive/vision sciences models and results from true experimentation preferably implemented by a digital signage system in accordance with the present invention. According to the embodiment shown in FIG. 12, content may be developed and distributed 602 in conformance with cognitive and vision sciences rules or models, such as in manners discussed hereinabove. A true experiment may be performed 604 to improve or optimize presentation effectiveness of the content. Conducting the true experiment may include identifying 606 dependent variables, such as a goal of increasing sales of a particular product. Independent variables may be identified 608, such as parameters associated with one or more CVS models (e.g., text readability, visual attention and/or memory parameters). Content may be modified 610 in view of the results from the true experiment. For example, content may be modified 612 on a display-by-display basis, based on improved or optimized parameters for each display. The modified content may be presented 614 on each of the displays in a manner optimized for each display.

Additional true experimentation may be conducted to further improve or optimize content presentation, particularly under changing environmental conditions or a change in the goals or intended message of the content. It is understood that quasi-experiments and correlational experiments may be performed in addition to, or to the exclusion of, a true experiment. Details of suitable quasi-/correlational experimental methods that may be adapted in accordance with the present invention are disclosed in U.S. Patent Publication No. 2005/039206, which is hereby incorporated herein by reference.

According to various embodiments, an expert system may be configured to implement a true experiment in the context of the present invention. The expert system may include a design processor having various hardware components including a central processing unit (CPU) and memory, among other components. The memory stores computer instructions that control the processes for designing the experiment and stores information acquired from the user that are needed for the experimental design. Under control of the software, the CPU algorithmically selects or generates questions to elicit information from a user. The questions are presented to the user via an output device of a user interface that is coupled to the design processor. For example, the user interface typically includes a display device, such as a liquid crystal display (LCD) or other type of display device for presenting the questions to the user. The user interface also includes one or more input devices, such as a touch screen responsive to a finger or stylus touch, a mouse, keyboard, voice recognition, or other type of input device. The user enters responses to the questions via one or more input devices(s) of the user interface. The design processor can determine the appropriate descriptive and inferential statistics for the experiment based on the experimental design and the characteristics of the independent and dependent variables.

The design processor may be configured to identify the information required to design a true experiment and selects or generates a series of questions that elicit responses from the user providing the required information. The questions are presented to the user via a user interface. User responses to the questions are received via the user interface and are transferred to the design processor. The design processor extracts information from the user responses and designs a true experiment based on the information. The expert system has the capability to collect information at specific steps that is relevant to other steps. For example, knowledge that the dependent variable is continuous in step X means a particular type of statistical analysis should be used in step Y. The system uses data from previous steps to complete later steps. For example, if the data has already been acquired, the system would not ask the user for the same information again. The user would not need to know that the information was relevant to both steps. If the data were not available from previous steps, the system would ask the user for the needed data.

A true experiment includes development of a hypothesis or objective. Dependent and independent variables are identified, and at least two levels of one or more independent variable are used. A control group and treatment groups are formed and samples are randomly assigned to levels of the independent variable. There is some kind of method for controlling for or eliminating confounding variables. For example, in a digital signage experiment, the system would guide the user through the process of controlling for carry over effects by 1) balancing and counterbalancing the order with which pieces of content are shown at locations across the network; and or 2) ensuring that two pieces of experimental content are not shown within a block of time in which viewers could see both pieces of content while in the store; and or 3) ensuring that sufficient time has elapsed before data are collected between when the content switches from one version of experimental content and another version of experimental content such that at least 95% of possible viewers who were in the store at the time of the content change would have left the store. If all of these elements are appropriately applied, the experiment produces results that can be used to make statistical inferences about the relationship between the dependent and independent variables. The expert system described herein allows a user who is unsophisticated in the complexities of true experimental design to design an experiment that produces substantially confound-free results and can be used to determine and quantify any causal relationship between independent and dependent variables.

Embodiments of the invention are directed to an expert system that has the capability of designing a true experiment based on user input. As previously mentioned, the use of the expert system relieves the user of having any foundation in the theory or practice of experimental design. A true experiment has at least two levels of an independent variable. The expert system elicits information from a user required to choose independent and dependent variables for the experiment. For example, in a digital signage experiment, the expert system might ask the user questions such as: "If content X (where X is any piece of content in which the user wants to experimentally evaluate) is effective, what are the changes in the world that you would expect to happen as a result of showing content X? The system would provide a number of possible changes such as: sales of a particular product will increase; foot traffic in a particular location in the store will increase; consumers will inquire with staff regarding the features of a particular product; consumers will pick a particular product off the shelf; and other, where other is any other change that is not included in the system's stored set of possible changes.

Those skilled in the art will appreciate that each of these possible "changes in the world" correspond to a possible dependent variable that could be measured in an experiment designed to test the effectiveness of content X. Likewise, the expert system could guide the user through the process of picking control content analogues to a placebo in a drug study. For example, the expert system would ask the user to identify content that would not be related in any way to the goal of content X. With respect to threats to internal validity, the expert system, via the sequence of questions and user responses, identifies threats to internal validity, and may initiate processes for controlling these threats, such as through balancing, counterbalancing and/or blocking, and/or randomization.

The expert system, based on user input, is capable of implementing processes for assigning samples randomly to groups so that each sample in an experiment is equally likely to be assigned to levels of the independent variable. The expert system is also capable of designing an experiment that includes randomization, counterbalancing and/or blocking. The system may assist the user in selecting independent variables or levels of independent variables, and assists the user in selecting dependent variables based on factors associated with internal and/or external validity of the experiment. For example, the system could obtain the necessary information to conduct power analyses on various combinations of independent and dependent variables, provide the user with the results of the various power analyses, the domain specific terms, and values that the user understands ("Using sales data to measure the effectiveness of this piece of content would take 8 weeks and cost $1400 whereas using sensor data would take 2 weeks and cost $800").

In some configurations, in addition to designing the true experiment, the expert system may aid the user in performing one or more of conducting true experiments, collecting data, statistically analyzing the data, and interpreting the results of the experiments. In addition to the experiment design processor and user interface previously described, the expert system may also include an experiment control processor configured to automatically or semi-automatically control the execution of the experiment. An experiment analysis processor may also be included that is configured to analyze the experimental data and/or interpret the results of the experiment. The functions of the control processor and the analysis processor are enhanced through knowledge of how the experiment was designed by the design processor.

For example, because the analysis processor will have received information regarding the independent and independent variables (e.g., whether the independent variables (IVs) and dependent variables (DVs) are continuous or discrete), the analysis processor would have much of the necessary information to choose the appropriate statistical test to apply to the data from the experiment. For example, if there is one IV with two discrete levels and one continuous DV, then a T-Test may be selected by the analysis processor for the inferential statistical test whereas if there is one IV with two discrete levels and one DV with two discrete levels, then a Chi-Squared test may be used for the inferential statistical test. Likewise, because the analysis processor will have access to information from the design processor regarding which experimental conditions are diagnostic of particular hypotheses, the analysis processor would have most or all of the information needed to determine which experimental and control conditions should be statistically compared and reported to the user. Additional details regarding methods and systems for designing and implementing true experiments in the context of the present invention are disclosed in commonly owned U.S. patent application Ser. No. 11/321,340, filed Dec. 29, 2005, which is incorporated by reference hereinabove.

Application of cognitive and vision sciences, alone or in combination with designing and implementing true experiments in accordance with the present invention, allows users with little or no background in the cognitive and vision sciences (or designing true experiments) to apply these disciplines in order to create more effective content. This functionality can be used in either a single or multi-screen environment. On a system-wide level, application of cognitive and vision sciences provides input and constraints for the automated content design system in order to tailor content on a screen-by screen basis. For example, if the average viewing distance is known for each network sign, then the component for applying the cognitive and vision sciences will determine the ideal font size for each display, and this information will be used by the automated content design component to generate text with those font-size parameters.

Automated content design and development according to the present invention may also provide for the automatic generation of new templates and application of transformations to existing elements. New templates and elements may be generated to improve the content effectiveness. Content development tools of the present invention may also be used to generate unique versions of pieces of content for each player in the system.

In some implementations, users may be prompted to provide input or may use information supplied from other components regarding the network attributes and factors that underlie content effectiveness. Knowledge from the cognitive and visions sciences may be used to extrapolate, fill in, and otherwise explore the information space for the particular pieces of content the system aims to enhance. The functionality of the content development tools provides the ability to generate completely new content that is not simply a reconfiguration of deployed templates or elements associated with deployed versions of content.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A computer-assisted method using a system having one or more processors and memories, comprising:
   developing content for presentation on a display, the content comprising content elements;
   providing display information comprising at least one of viewer dwelling time and average viewing distance from the display;
   selecting, by way of computer assistance one of a plurality of content templates, wherein the computer assistance comprises the processor applying cognitive and vision sciences to the plurality of content templates and the display information to provide a user with a plurality of content template options;
   facilitating, by way of computer assistance, the development of the content using the selected content template;
   analyzing, by one of the one or more processors, the content using a computer cognitive and vision sciences model, wherein the model includes each of a visual attention, text readability, and memory principle model;
   producing analysis output; and
   automatically modifying, by one of the one or more processors, the content based on the analysis output.

2. The method of claim 1, comprising alerting a user in response to violation of one or more of the design rules or models.

3. The method of claim 1, wherein facilitating the development of the content comprises facilitating selection of content element attributes based on one or more attributes of the display or display environment.

4. The method of claim 3, wherein the one or more attributes comprise one or more of display type, display size, display shape, average viewing distance from the display, average speed of viewer movement relative to the display, viewer dwelling time, ambient lighting at a location of the display, and time of day of content presentation on the display.

5. A system, comprising:
   a database comprising design rules or models based on a computational model of visual attention;
   a user interface wherein a user can enter display information, comprising at least one of viewer dwelling time and average viewing distance from the display; and
   a processor coupled to the database and the user interface, the processor configured to:
      apply cognitive and vision sciences a plurality of content templates and the display information to provide a user with a plurality of content template options;
      receive a user's selection of one of the plurality of content templates;
      facilitate development of content for presentation on the display using the selected content template;
      analyze the content using a computer cognitive and vision sciences model, wherein the model includes each of a visual attention, text readability, and memory principle model;
      produce analysis output; and
      automatically modify the content based on the analysis output.

6. The system of claim 5, wherein the processor is configured to generate an alert for a user in response to violation of one or more of the design rules or models.

7. The system of claim 5, wherein the processor is configured to automatically adjust the content in response to non-compliance with the design rules or models.

8. The system of claim 5, wherein the processor is further configured facilitate development of the content for a plurality of networked displays, the processor further configured to:
   receive user input data comprising information regarding each content element, the information comprising one or both of content goal and intended message;
   facilitate user identification of attributes of the networked displays or display environments that have implications for content development; and
   facilitate the development of the content using the design rules or models, user input data, and display attributes.

9. The system of claim 5, wherein the processor is configured to facilitate modification of the developed content in compliance with the design rules or models.

10. The system of claim 9, wherein the processor is configured to modify the developed content in response to a change in one or more attributes of the displays or display environments.

11. The system of claim 10, wherein the one or more attributes comprise one or more of display type, display size, display shape, average viewing distance from the display, average speed of viewer movement relative to the display, viewer dwelling time, ambient lighting at a location of the display, and time of day of content presentation on the display.

12. The system of claim 5, wherein the processor is configured to facilitate development of the content for a plurality of networked displays, the processor further configured to facilitate modification of the developed content for particular displays of the plurality of networked displays in response to a change in an attribute of the particular displays or environments associated with the particular displays.

13. The system of claim 5, wherein the processor is configured to perform a true experiment that produces results useful for improving or optimizing effectiveness of content presentation.

14. The system of claim 5, comprising one or more sensors for sensing one or more attributes of the display environment.

15. The system of claim 14, wherein the one or more sensors comprise a video camera.

16. The system of claim 14, wherein the one or more sensors comprise one or more proximity sensors.

* * * * *